United States Patent
Shirai et al.

[11] Patent Number: 5,818,355
[45] Date of Patent: Oct. 6, 1998

[54] AUTOMOTIVE ANTI-COLLISION AND ALARM SYSTEM

[75] Inventors: Noriaki Shirai, Oobu; Katsuhiko Hibino, Kariya; Takao Nishimura, Nagoya, all of Japan

[73] Assignee: Denso Corporation, Kariya, Japan

[21] Appl. No.: 780,182

[22] Filed: Dec. 26, 1996

[30] Foreign Application Priority Data

Dec. 26, 1995 [JP] Japan ................... 7-339620

[51] Int. Cl.⁶ ............................. G08G 1/16; B60Q 1/00
[52] U.S. Cl. ..................... 340/903; 340/904; 340/435; 340/436; 342/70; 180/167
[58] Field of Search .................... 340/435, 436, 340/901, 903, 905, 904; 180/167, 169; 364/461, 424.05, 426.01; 342/70, 71, 72; 701/301, 42, 70

[56] References Cited

U.S. PATENT DOCUMENTS

| | | | |
|---|---|---|---|
| 4,632,543 | 12/1986 | Endo | 180/167 |
| 5,249,157 | 9/1993 | Taylor | 340/435 |
| 5,315,295 | 5/1994 | Fujii | 340/435 |
| 5,321,407 | 6/1994 | Kikuchi et al. | 342/70 |
| 5,355,118 | 10/1994 | Fukuhara | 340/435 |
| 5,461,357 | 10/1995 | Yoshioka et al. | 340/435 |
| 5,530,651 | 6/1996 | Uemura et al. | 340/435 |
| 5,631,639 | 5/1997 | Hibino et al. | 340/435 |

FOREIGN PATENT DOCUMENTS

| | | | |
|---|---|---|---|
| 3-016846 | 1/1991 | Japan | B60R 21/00 |
| 7-262498 | 10/1995 | Japan | B60R 21/00 |
| 7-262499 | 10/1995 | Japan | B60R 21/00 |
| 7-291063 | 11/1995 | Japan | B60R 21/00 |
| 7-296298 | 11/1995 | Japan | B60R 21/00 |
| 7-318652 | 12/1995 | Japan | B60R 21/00 |
| 8-279099 | 10/1996 | Japan | G08G 1/16 |

*Primary Examiner*—Brent A. Swarthout
*Assistant Examiner*—Van T. Trieu
*Attorney, Agent, or Firm*—Cushman Darby & Cushman IP Group of Pillsbury Madison & Sutro LLP

[57] ABSTRACT

An estimated travelling curve La (radius Rea) of a system vehicle is obtained based on a first group of sampling data (X1, Y1) through (X5, Y5). Alarm area WA1a is set as a region surrounded by a pair of circular arcs parallel shifted from curve La by ±1 m and a pair of straight lines (Y=Y1 and Y=Y5). Similarly, an estimated travelling curve Lb (radius Reb) is obtained based on a second group of sampling data (X3, Y3) through (X5, Y5). Alarm area WA1b is set as a region surrounded by a pair of circular arcs parallel shifted from curve Lb by ±1 m and straight lines (Y=Y1 and Y=Y5). At the entrance and exit of a curved road, values of radii Rea and Reb are differentiated. Hence, the collision judgement is performed by using different alarm areas WA1a and WA1b.

3 Claims, 18 Drawing Sheets

AUTOMOTIVE ANTI-COLLISION AND ALARM SYSTEM

BACKGROUND OF THE INVENTION

1. Field of the Invention

This invention relates to an anti-collision and alarm system for detecting an obstacle existing in a predetermined angular or lateral scanning zone extending in the forward direction of a vehicle, and for generating an alarm when the detected obstacle is present within a predetermined region. Particularly, this invention relates to an anti-collision and alarm system capable of accurately detecting the target obstacle when the vehicle is travelling on a curved road or in a transient phase transferring from a straight road to a curved road or vice versa.

2. Related Art

There is an anti-collision and alarm system capable of detecting an obstacle existing in the forward direction by means of a radar or the like and generating an alarm when the obstacle is approaching to the system vehicle. However, when the vehicle is travelling on a curved road, there is a possibility of detecting a preceding vehicle running on another traffic lane and erroneously judging this preceding vehicle as an obstacle even though there is no possibility of collision.

To solve such a problem, Unexamined Japanese Patent Application NO. 3-16846, published in 1991, discloses a technique of sampling position data (e.g. distance and angle data) of an obstacle from a vehicle at a plurality of sampling times and obtaining an estimated straight line based on a linear approximation of these position data to judge whether the resultant straight line crosses the vehicle. When the estimated straight line crosses the vehicle, an alarm is generated.

However, simply obtaining a linear approximation of the obstacle trace is not satisfactory in view of accuracy in the collision judgement. For example, in an entrance or exit of a curved road, a steering angle is definitely changed. In accordance with this change of the steering angle, the radius of the travelling curve of the vehicle is changed. According to the above-described linear approximation, it is difficult to predict or quickly respond to such a sudden change of the travelling curve, thus resulting in erroneous detection of obstacles.

SUMMARY OF THE INVENTION

Accordingly, in view of above-described problems encountered in the related art, a principal object of the present invention is to provide a novel and excellent anti-collision and alarm-system capable of accurately generating an alarm even in a specific moment where the radius of the system vehicle's travelling curve is changed.

In order to accomplish this and other related objects, the present invention provides an anti-collision and alarm system having various aspects which will be described hereinafter.

A first aspect of the present invention provides an anti-collision and alarm system installable on an automotive vehicle, comprising target obstacle detecting means and alarm means. The target obstacle detecting means successively samples a distance and an angle of a target obstacle relative to a system vehicle equipped with the anti-collision alarm system when the target obstacle exists in a predetermined scanning zone. Alarm means generates an alarm. Furthermore, the anti-collision and alarm system comprises, as characteristic features, first radius calculating means, second radius calculating means, first alarm region setting means, and second alarm region setting means.

More specifically, first radius calculating means calculates a first radius of an estimated travelling curve of the system vehicle in relation to the target obstacle based on a first group of distance and angle data detected at a plurality of sampling times by the target obstacle detecting means. Second radius calculating means calculates a second radius of an estimated travelling curve of the system vehicle in relation to the target obstacle based on a second group of distance and angle data detected at a plurality of sampling times by the target obstacle detecting means. The first group is different from the second group in the combination of the distance and angle data. First alarm region setting means sets a predetermined first alarm region based on the first radius calculated by the first radius calculating means. Second alarm region setting means sets a predetermined second alarm region based on the second radius calculated by the second radius calculating means. And, the alarm means generates an alarm based on a positional relationship between the target obstacle detected by the target obstacle detecting means and each of the first alarm region set by the first alarm region setting means and the second alarm region set by the second alarm region setting means. Rectangular coordinate values are obtained by converting polar coordinate values representing the detected distance and angle.

With the above-described arrangement, the present invention uses different combinations of the position (distance and angle) data detected at a plurality of sampling times to calculate the radius of the estimated travelling curve of the system vehicle in relation to the preceding target obstacle. Thus, it becomes possible to provide two collision alarm regions having different sensitivities to the change of the system vehicle's travelling path. Hence, the alarm means can generate an alarm accurately in response to the radius change of the travelling curve. In other words, the present invention makes it possible to generate an alarm accurately even in a transient phase where the radius of the system vehicle's travelling curve is changed.

It is preferable that the alarm means be activated only when the target obstacle detected by the target obstacle detecting means exists in both of the first alarm setting region and the second alarm setting region.

Moreover, it is preferable that the first group of distance and angle data used for obtaining the first radius includes all of the second group of distance and angle data used for obtaining the second radius. In this case, the first group of distance and angle data includes distance and angle data sampled prior to the second group of distance and angle data.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
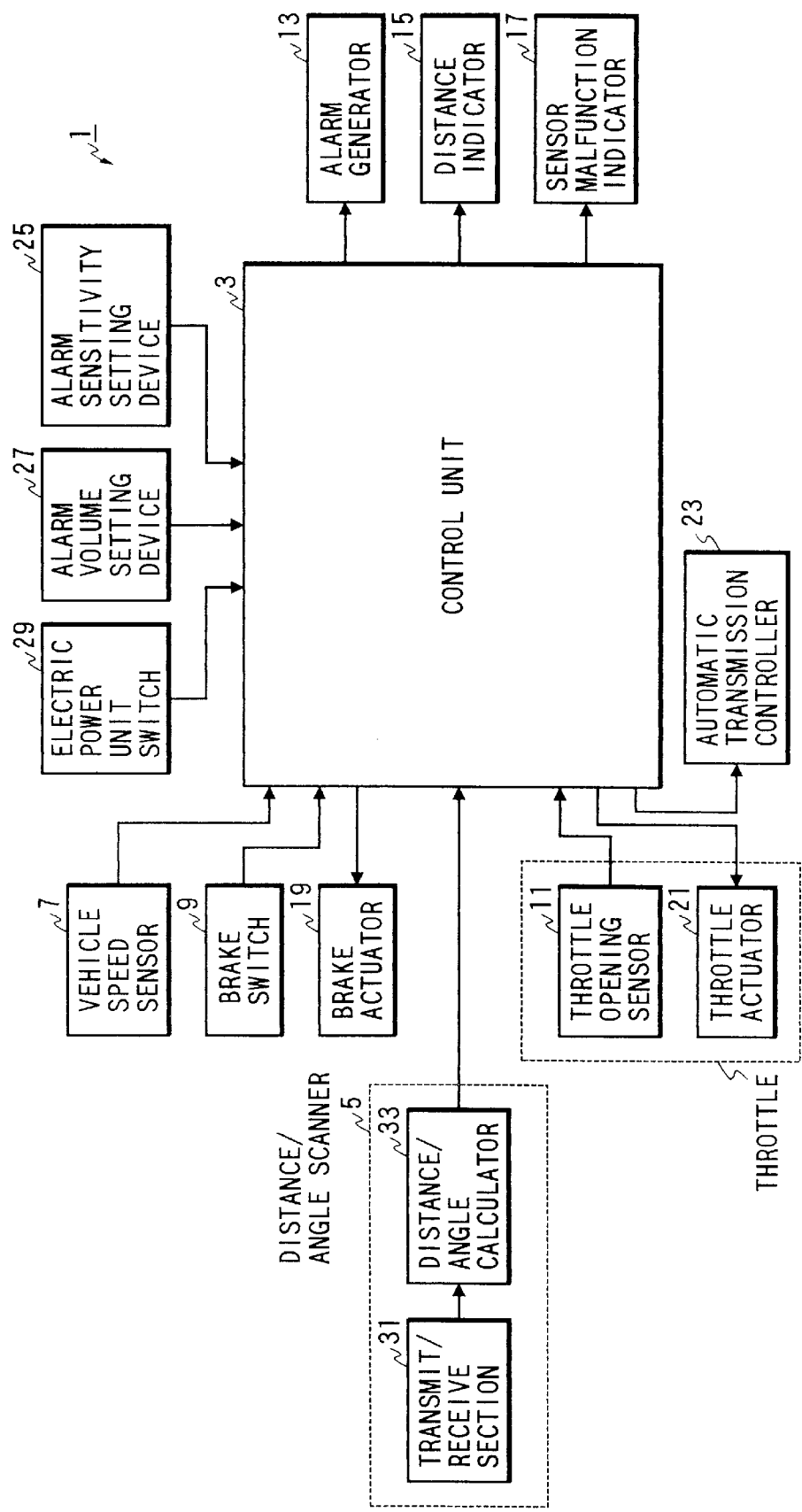
FIG. 1 is a schematic block diagram showing one embodiment of an anti-collision and alarm system in accordance with the present invention.

Preferred embodiments of an automotive anti-collision and alarm system in accordance with the present invention will be explained hereinafter with reference to the accompanying drawings. Identical parts are denoted by the same reference numerals throughout the views.

An anti-collision and alarm system 1, installable or incorporated in an automotive vehicle, has a primary function of optically or electromagnetically or acoustically detecting various objects running or staying in the forward direction of the vehicle. When a target object enters a predetermined zone, a possibility of collision is judged. Based upon the judgement result, an alarm is generated to notify a driver of impending danger.

FIG. 1 is a schematic block diagram showing the anti-collision and alarm system 1. The anti-collision and alarm system 1 comprises a control unit 3 as a main component. The control unit 3 includes a micro computer, I/O interfaces, various drivers and detecting circuits. The hardware arrangements of these components are generally well-known and, therefore, will be not explained in detail in the following description.

The control unit 3 receives various detection signals measured by a distance/angle scanner 5 (i.e. target detecting means), a vehicle speed sensor 7, a brake switch 9, and a throttle opening sensor 11.

The control unit 3 sends various drive signals to an alarm sound generator 13 (i.e. alarm means), a distance indicator 15, a sensor malfunction indicator 17, a brake actuator 19, a throttle actuator 21, and an automatic transmission controller 23.

The control unit 3 further comprises an alarm sensitivity setting device 25 and an alarm volume setting device 27, with which alarm timing and volume of later-described processing are controlled. The control unit 3 comprises an electric power unit switch 29 through which electric power is supplied to the control unit 3 to start predetermined processing upon a turning-on operation.

The distance/angle scanner 5 comprises a transmit/receive section 31 and a distance/angle calculator 33. The transmit/receive section 31 emits or transmits a laser beam in the forward direction of the vehicle within a predetermined scanning angle, and detects a returning laser beam reflected from an object (a target obstacle) existing in the forward direction of the vehicle. The distance/angle calculator 33 detects a relative speed, a distance, and position coordinates to the preceding object on the basis of a time interval between a moment of transmission of the laser beam and a moment of reception of the returning laser. The arrangement of such a distance/angle scanning device is well known and, therefore, details of distance/angle scanner 5 will not be explained.

Besides the scanner capable of detecting all of relative speed, distance, and position coordinates to the preceding object, it is also possible to use a scanner detecting only two kinds of data (e.g. the relative speed and the distance) of the preceding vehicle. Furthermore, the laser beam can be replaced by other electromagnetic waves, such as microwaves, or supersonic waves. Moreover, a mono-pulse type radar system having a plurality of receiving sections will be preferably used, in such a manner that distance/angle calculator 33 calculates the distance and the angle of the target based on the differences in intensity or phase (time) between the plurality of received signals.

The control unit 3, having the arrangement described above, measures a distance to a preceding vehicle or an obstacle existing ahead of the vehicle equipped with the anti-collision and alarm system 1 (hereinafter the "system vehicle"). The control unit 3 detects the moment that the distance between the preceding vehicle or obstacle and the system vehicle is in a predetermined alarm condition later described. Furthermore, the control unit 3 generates an alarm when the system vehicle is in the alarm condition for a predetermined period of time.

The brake actuator 19, the throttle actuator 21 and the automatic-transmission controller 23, shown in FIG. 1, are cooperatively used for executing a so-called cruising control, which controls the speed of the system vehicle in accordance with the speed of the preceding vehicle.

Figure 2:
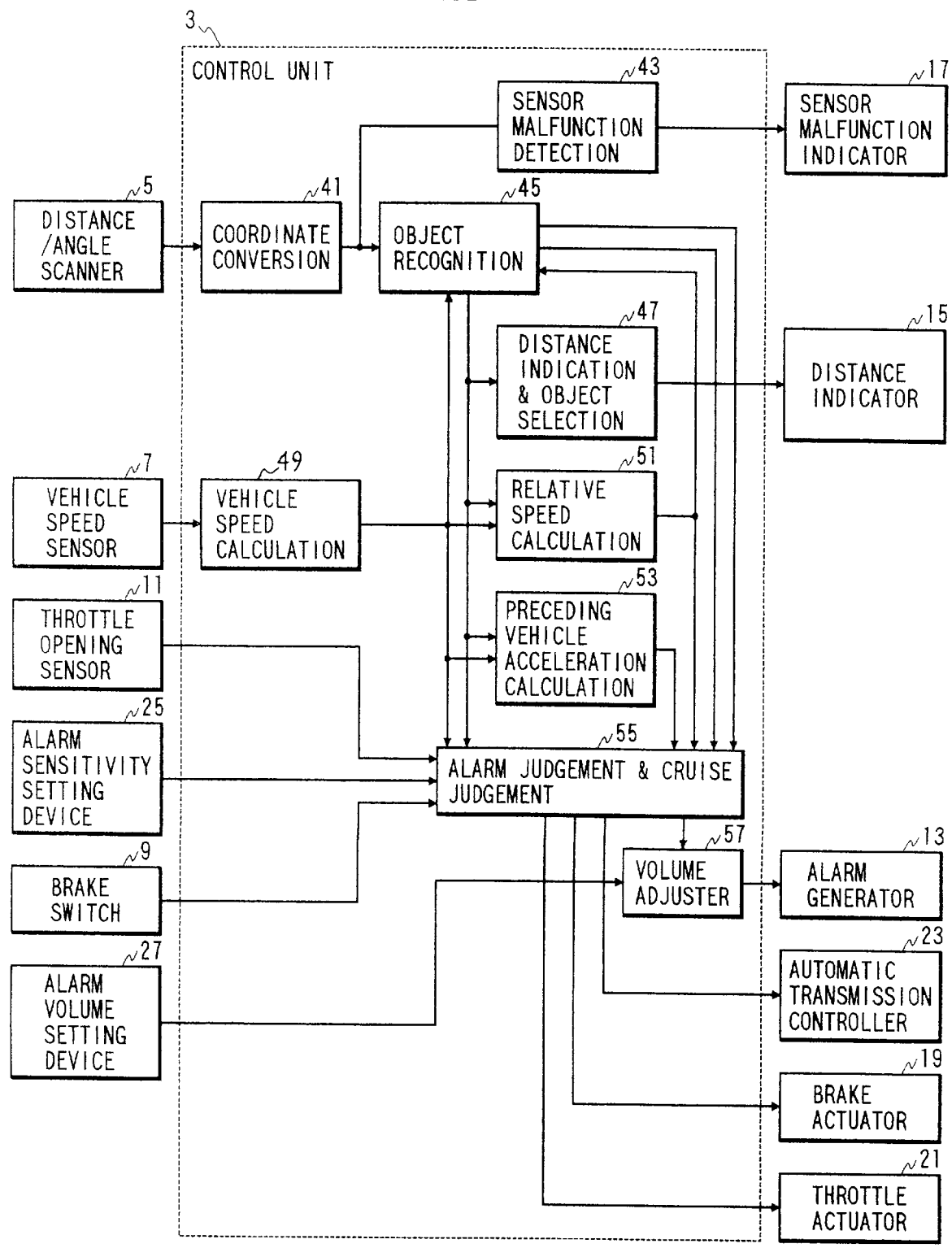
FIG. 2 is a block diagram showing details of a control unit in the anti-collision and alarm system in accordance with the present invention.

FIG. 2 is a block diagram showing details of the control unit 3 of the anti-collision and alarm system 1. Data relating to distance L and scanning angle θ, generated from the distance/angle calculator 33 of the distance/angle scanner 5, are converted by a coordinate conversion block 41 into coordinate values expressed by the XY rectangular coordinate system with an origin (0, 0) placed on the system vehicle. A sensor malfunction detecting block 43 checks whether or not the converted data are abnormal, and causes a sensor abnormal indicator 17 to display a notification that a corresponding sensor has malfunctioned.

An object recognition block 45 obtains a recognition type (i.e. type of a recognized object), width W of the object and central position coordinates (X, Y) of the object on the basis of the mutual relationship between the XY rectangular coordinate system and the system-equipped vehicle. The recognition type represents the result of a judgement as to whether the detected object is recognized as a mobile object or a stationary object. A distance indication and object selection block 47 selects, on the basis of the central position (X, Y) of the object, an object to be displayed which gives any effect or influence on the travelling of the system vehicle, and causes the distance indicator 15 to display a distance to the object of concern.

A vehicle speed calculating block 49, connected to the vehicle speed sensor 7, generates a vehicle speed (i.e. system vehicle speed) V representative of an output of the vehicle speed sensor 7. A relative speed calculating block 51, receiving both the vehicle speed V generated from the vehicle speed calculating block 49 and the central position data (X, Y) obtained by the object recognition block 45, obtains a relative speed Vr of the preceding vehicle or obstacle with respect to the system vehicle. A preceding vehicle acceleration calculating block 53, also receiving both the vehicle speed V generated from the vehicle speed calculating block 49 and the central position data (X, Y) obtained by the object recognition block 45, obtains an acceleration of the preceding vehicle (i.e. a relative acceleration of the preceding vehicle with respect to the system vehicle).

An alarm judgement and cruise judgement block 55, receiving the system vehicle speed, the preceding vehicle relative speed, the preceding vehicle acceleration, the object central position, the object width, the recognition type, an output of the brake switch 9, a throttle opening degree detected by the throttle opening sensor 11, and a sensitivity setting level by the alarm sensitivity setting device 25, makes an alarm judgement as to whether the alarm is necessary and also makes a cruise judgement as to what kind of content is determined for the vehicle speed control.

When the alarm is required as a result of the alarm judgement, the alarm judgement and cruise judgement block 55 generates an alarm activation signal to the alarm generator 13 via a volume adjuster 57. The volume adjuster 57 controls an output volume of the alarm generator 13 in accordance with a setting value of the alarm volume setting device 27.

When the cruise control is required as a result of the cruise judgement, the alarm judgement and cruise judgement block 55 generates necessary control signals and sends them to the automatic transmission controller 23, the brake actuator 19 and the throttle actuator 21, thereby executing the desirable cruise control.

The alarm judgement and alarming operation by the alarm judgement and cruise judgement block 55 will be explained in greater detail.

Figure 3:
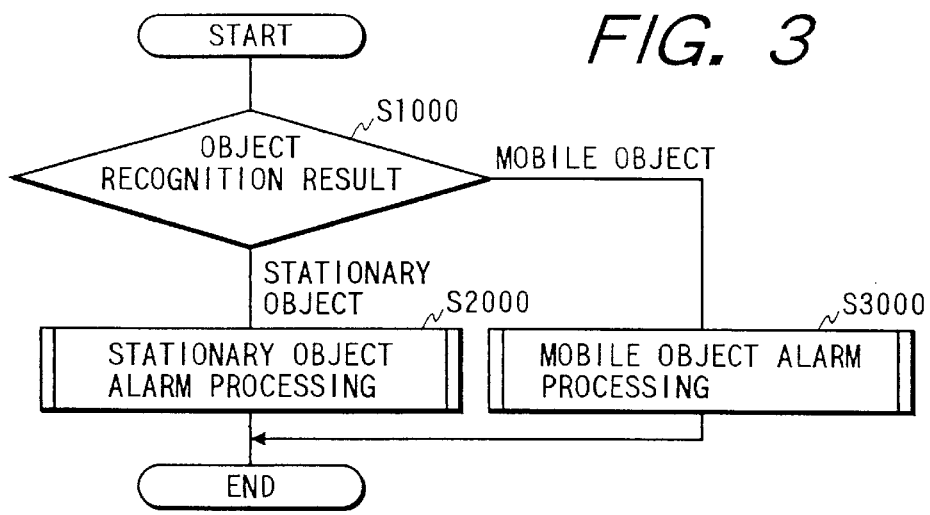
FIG. 3 is a flow chart showing alarm processing performed in the control unit of the anti-collision and alarm system in accordance with the present invention.

FIG. 3 is a flow chart showing collision alarm processing, which is repeatedly executed upon turning-on operation of the power unit switch 29. First, the object recognition result is checked in step S1000. Namely, a judgement is made as to whether the scanned object is a mobile object or a stationary object. More specifically, the object recognition processing is carried out in the object recognition block 45 based on the system vehicle speed V and the relative speed Vr of the preceding object. For example, when the position of the preceding object relative to the system vehicle does not change so much, it is recognized that the preceding object is a mobile object. An object gradually departing from the system vehicle is also recognized as a mobile object. In other cases, the scanned object will be judged as a stationary object (a true stationary object or an unidentified object).

If the preceding object is a stationary object, stationary object alarm processing is executed in step S2000. If the preceding object is a mobile object, mobile object alarm processing is executed in step S3000.

A stationary object alarm distance, generally defined as a desirable value, is a distance sufficiently long for the system vehicle to stop safely. However, due to practical limitations relating to sensor ability and collision judgement, the stationary object alarm distance is set to a value defined based on various practical restrictions. The stationary object alarm distance is determined by considering a distance required for the system vehicle to stop safely, and is differentiated in accordance with the travelling speed of the system vehicle. For example, when the system vehicle is travelling in a low speed region (e.g. less than 60 Km/h), the stationary object alarm distance is set based on a distance required for the system vehicle to stop safely under an ordinary braking operation. Meanwhile, the stationary object alarm distance in a high speed region (e.g. more than 60 Km/h) is set by considering a distance required to stop safely under a stronger braking operation.

More specifically, this stationary object alarm distance is determined by taking account of the following two factors:

(I) a response time factor corresponding to a response time of a driver's braking operation of the system vehicle; and (II) a deceleration factor corresponding to a depressing strength at the brake pedal in the driver's braking operation of the system vehicle.

Regarding factor I, there is a significant response time between a moment the driver decides to apply braking and a moment the driver actually depresses the brake pedal. A free-running distance, i.e. a travelling distance during this response time, depends on the response time and the system vehicle speed.

Regarding factor II, there is a braking time between the moment the driver actually depresses the brake pedal and a moment the system vehicle actually stops. A braking distance, i.e. a travelling distance during this braking time, depends on the braking strength and the system vehicle speed.

Furthermore, there is a personal factor reflecting the driving ability of each driver. In view of such drivers' individual sensitivities to the danger, the alarm sensitivity setting device 25 allows every driver to set his own preferable sensitivity level.

The stationary object alarm processing (Step S2000) will be hereinafter explained in greater detail with reference to the flow chart of FIG. 4. First, step S2100 performs stationary object alarm distance calculating processing which is executed to obtain a stationary object alarm distance. Next, in step S2200, the stationary object alarm distance is compared with an actual distance between the system vehicle and the target obstacle. When the actual distance between the system vehicle and the target obstacle is not larger than the stationary object alarm distance, a collision judgement is performed in step S2300.

Figure 5:
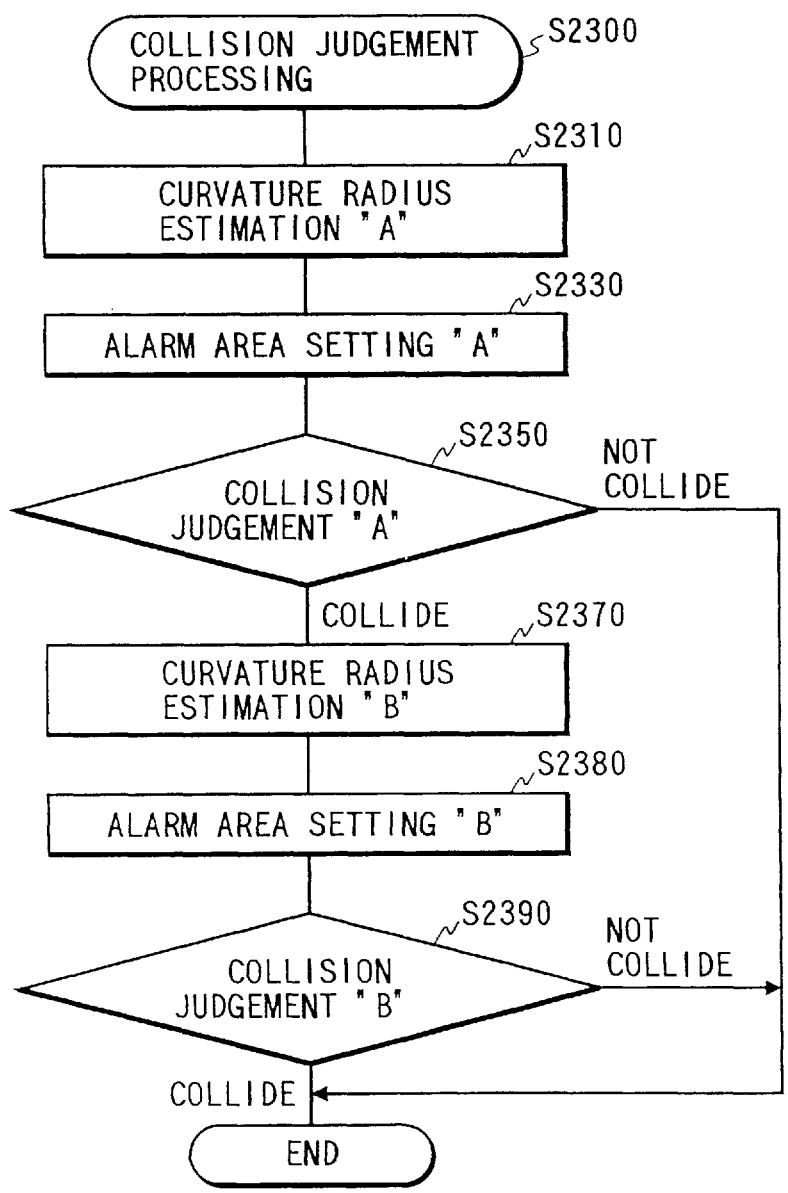
FIG. 5 is a flow chart showing collision judgement processing performed in the control unit of the anti-collision and alarm system in accordance with the present invention.

FIG. 5 shows the details of the collision judgement. First of all, in step S2310, curvature radius estimation processing "A" is executed to estimate a curvature radius based on positional change data of the target obstacle recognized in the last five consecutive scanning or sampling operations. Then, in step S2330, alarm area setting processing "A" is executed to set an alarm area based on the curvature radius estimated in the step S2310. Subsequently, in step S2350, collision judgement processing "A" is executed based on the alarm area set in the step S2330 to judge whether there is any possibility that the system vehicle will collide with this target obstacle.

When the step S2350 judges that there is any possibility of collision, curvature radius estimation processing "B" is executed in step S2370 to estimate a curvature radius based on positional change data of the target obstacle recognized in the last three consecutive scanning or sampling operations. Then, in step S2380, alarm area setting processing "B" is executed to set an alarm area based on the curvature radius estimated in the step S2370. Subsequently, in step S2390, collision judgement processing "B" is executed based on the alarm area set in the step S2380 to judge whether there is any possibility that the system vehicle will collide with this target obstacle. Then, the collision judgement processing at step S2300 is completed.

Figure 4:
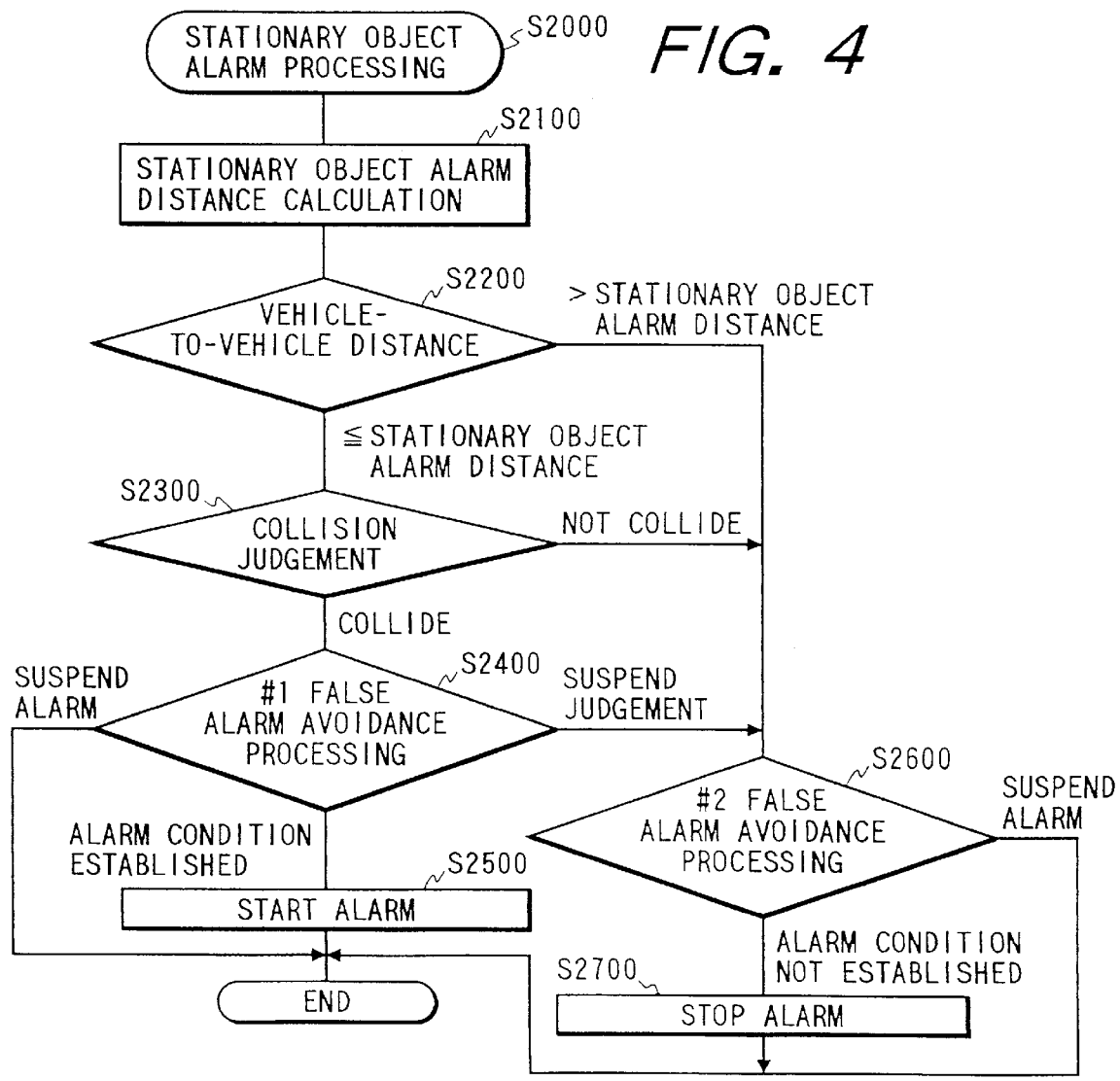
FIG. 4 is a flow chart showing stationary object alarm processing performed in the control unit of the anti-collision and alarm system in accordance with the present invention.

When the step S2390 judges that there is any possibility of collision, first false alarm avoidance processing is executed in step S2400 of FIG. 4. When the step S2350 or S2390 judges that there is no possibility of collision, second false alarm avoidance processing is executed in step S2600 of FIG. 4.

Figure 6:
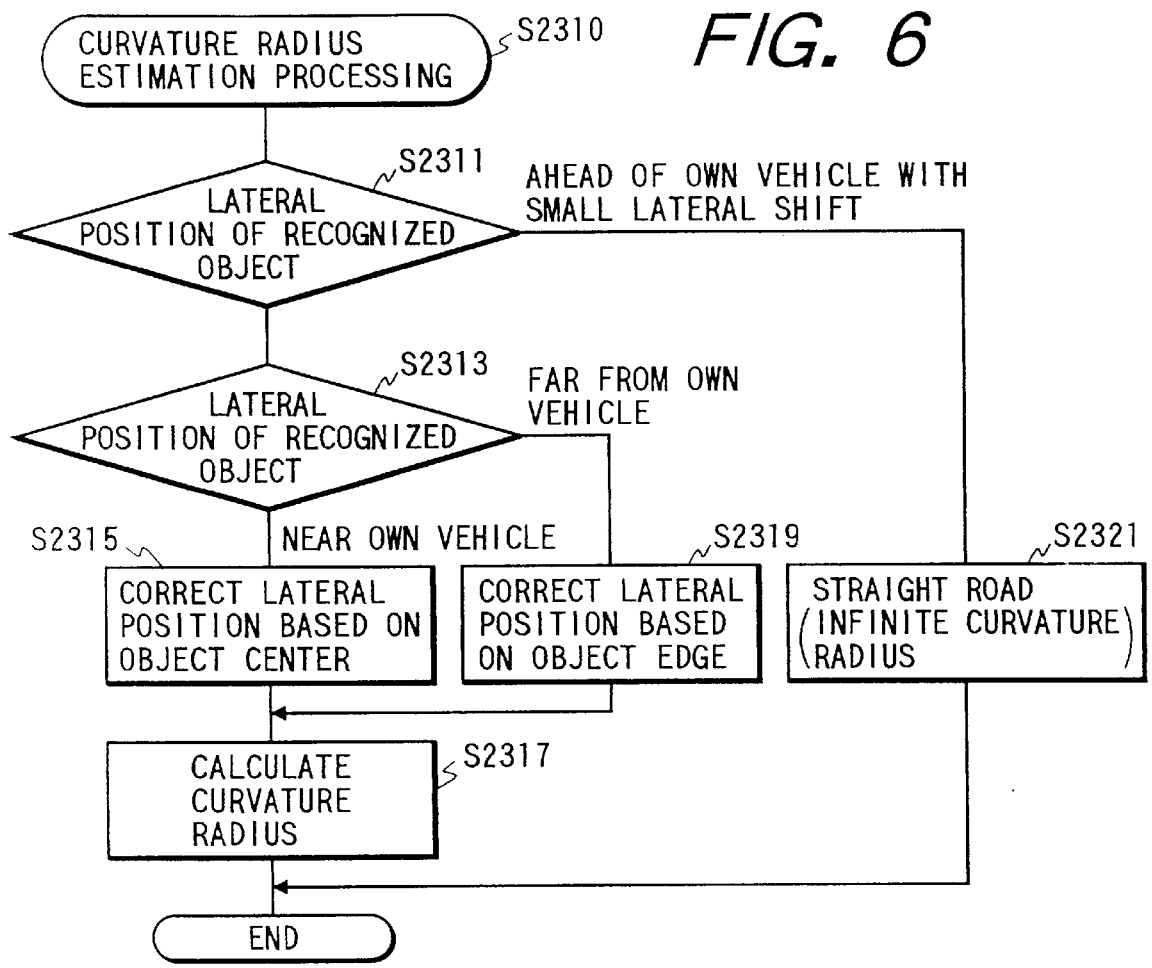
FIG. 6 is a flow chart showing curvature radius estimation processing performed in the control unit of the anti-collision and alarm system in accordance with the present invention.

Details of the curvature radius estimation processing "A" of step S2310 will be explained with reference to the flow chart shown in FIG. 6. In this curvature radius estimation processing, a total of three kinds of error avoidance processing are executed based on the position data of the target obstacle in the lateral direction (lateral direction of the vehicle; X coordinate).

Figure 12:
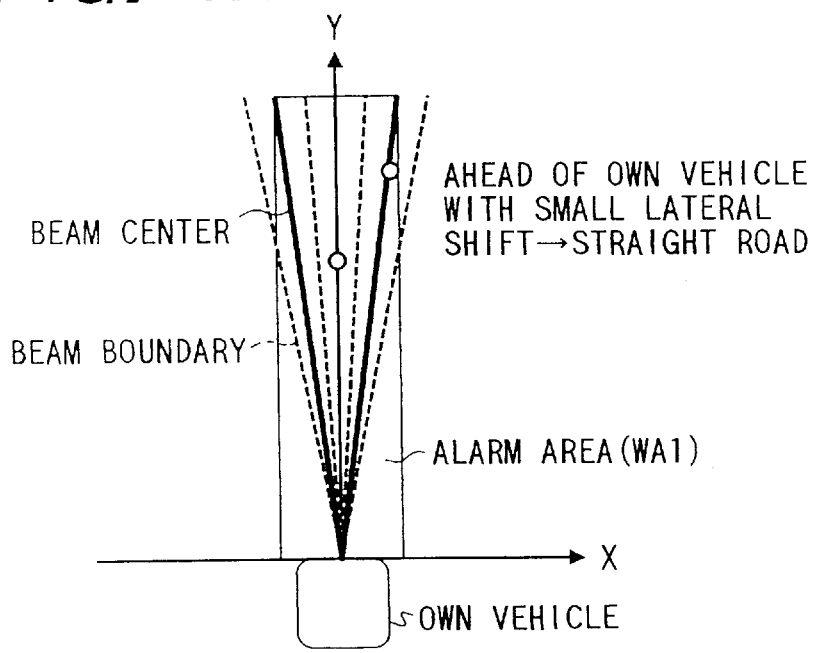
FIG. 12 is a view illustrating a straight travelling zone of a vehicle used in step S2321 of FIG. 6.

First error avoidance processing is performed to solve an error derived from lateral sensor resolution. When relative position data including erroneous data are used in the estimation, there is a possibility that a dangerous stationary obstacle will be judged to be a safe object even though this stationary obstacle is approaching directly and will collide with the system vehicle. To compensate for such an error, an effective countermeasure is provided. As shown in FIG. 12, when a target obstacle exists in a predetermined forward region (alarm area WA1) ahead of the system vehicle and a relative shift movement in the lateral direction of the vehicle is small, it is assumed that the vehicle is running straight and a curvature radius is not calculated.

More specifically, when a start point of the calculated position data is within three beam steps in the front side of the scanning laser beam and a shift amount from the start point to an end point is within one beam step, the control flow proceeds to step S2321 by regarding the vehicle as travelling straight (i.e. infinite curvature radius) without estimating the curvature radius, and then terminates the curvature radius estimation processing.

Next, second error avoidance processing is performed to solve an error derived from reflection dispersion. When a preceding vehicle has a reflector on the rear end thereof, both right and left edges of the reflector are not always recognized and there is a possibility that the reflection will be significantly changed when either one edge of the reflector is not recognized. Due to this reflection change, a calculated relative position will include an error. To solve this problem, another effective countermeasure is provided. In step S2315, anti-collision and alarm system 1 obtains a linear approximation of five points based on the least square of their relative position data and corrects the position data of start and end points of these five points. Positional change among five points will not give adverse effect to the estimation as a result of linear approximation. The above described correction is executed when step S2313 judges that the lateral position of the recognized object was in the proximity of the center of the system vehicle.

In the step S2315, the correction is performed in the following manner. The lateral positions of the corrected start and end points are expressed by the following equations.

$$Xe1 = a + b \cdot Y1, Xe5 = a + b \cdot Y5$$

where $$b = \frac{\Sigma YiXi - (1/n)(\Sigma Yi)(\Sigma Xi)}{\Sigma Yi^2 - (1/n)(\Sigma Yi)^2}$$

and $$a = \frac{\Sigma Xi}{n} - b \cdot \frac{\Sigma Yi}{n}$$

Figure 13:
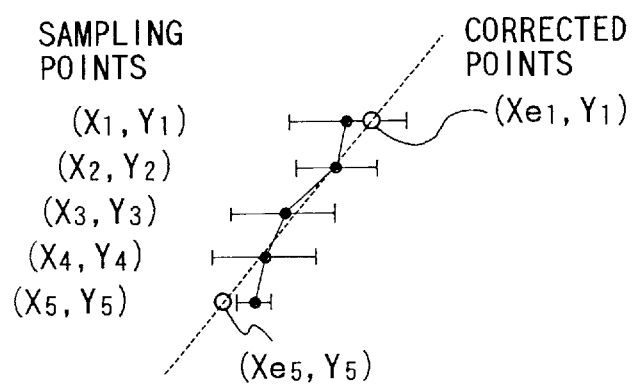
FIG. 13 is a view illustrating correction performed in step S2315 of FIG. 6.

FIG. 13 explains the correction performed in the step S2315.

Figure 14A:
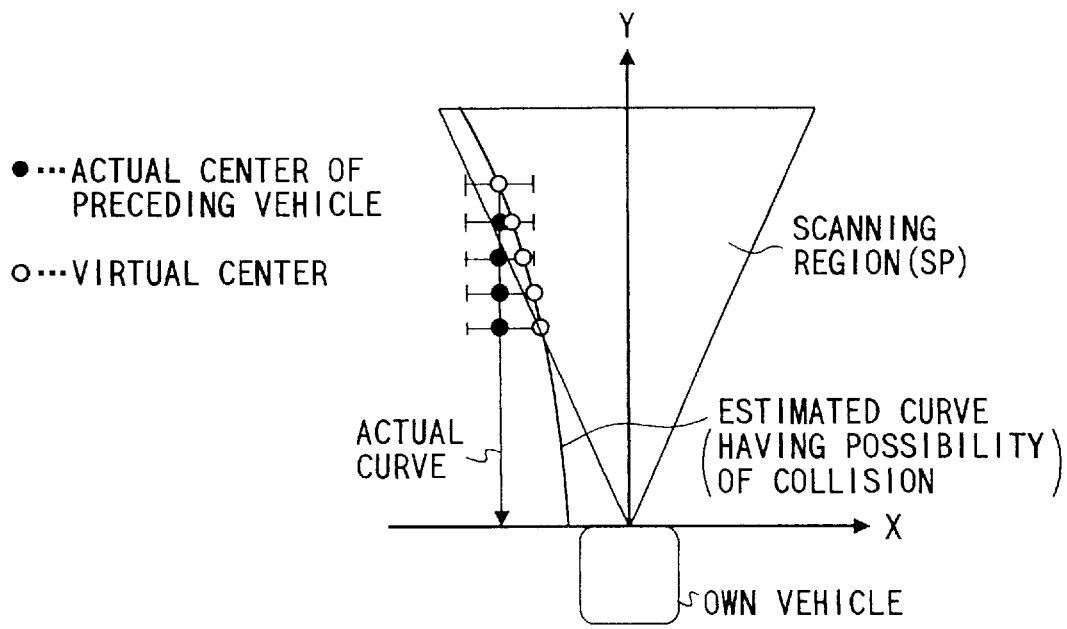
FIGS. 14A and 14B are views illustrating correction performed in step S2319 of FIG. 6.

Next, third error avoidance processing is performed to solve an error derived from the limit of the scanning region. FIG. 14A illustrates this error. When a preceding vehicle is a stopped or slow vehicle, this preceding vehicle goes out of a scanning region SP as the system vehicle passes this preceding vehicle. In such a case, the actual center (black round mark) of the preceding vehicle shifts along a line parallel to a travelling path of the system vehicle. However, a virtual center (white round mark) of the preceding vehicle detected by distance/angle scanner 5 shifts along an erroneously estimated curve colliding with the system vehicle due to the fact that one of the right and left edges of the rear reflector of the preceding vehicle disappears during this period of time.

Figure 14B:
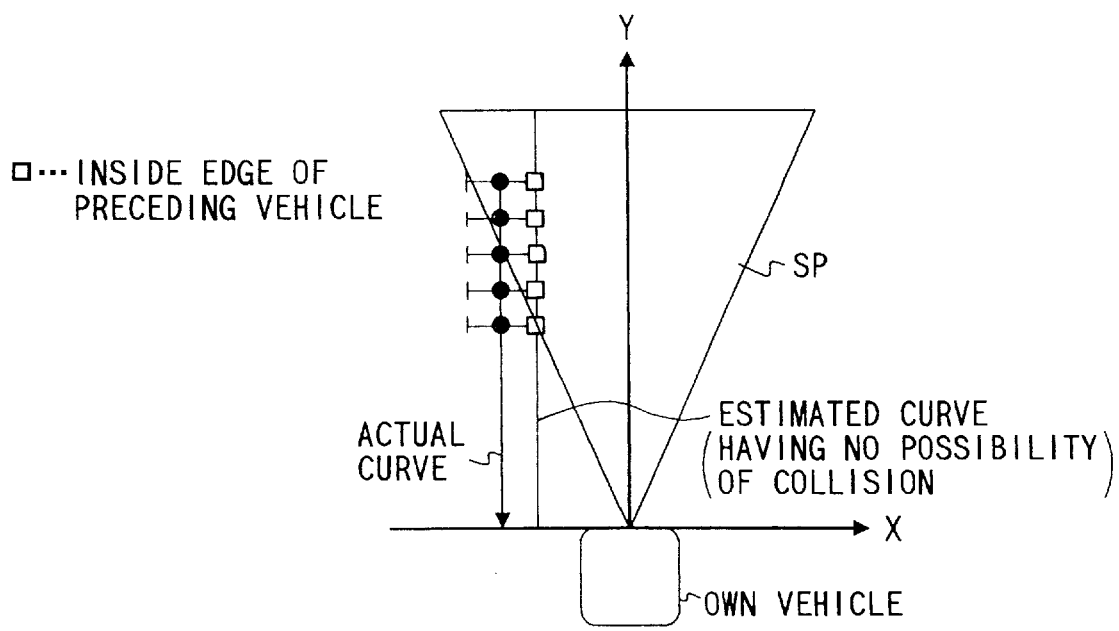

To solve this problem, in step S2319, anti-collision and alarm system 1 executes a lateral-directional position correction based on the inside edge (white square mark) of the target obstacle as shown in FIG. 14B.

This correction (step 2319) is executed when the step S2313 judged that the lateral position of the recognized object was far from the center of the system vehicle. For example, the condition for executing the step S2319 is that both of the start and end points of the sampled five points are spaced from the center of the system vehicle by a distance larger than 2 m in the lateral direction. In this lateral-directional position correction, data of five inside edges are used. The anti-collision and alarm system 1 obtains a linear approximation of five inside edges based on the least square of their relative position data and corrects the position data of start and end points of these five inside edges. Then, in step S2317, a curvature radius calculation is performed to obtain a curvature radius based on the corrected position data of the start and end points.

Figure 15:
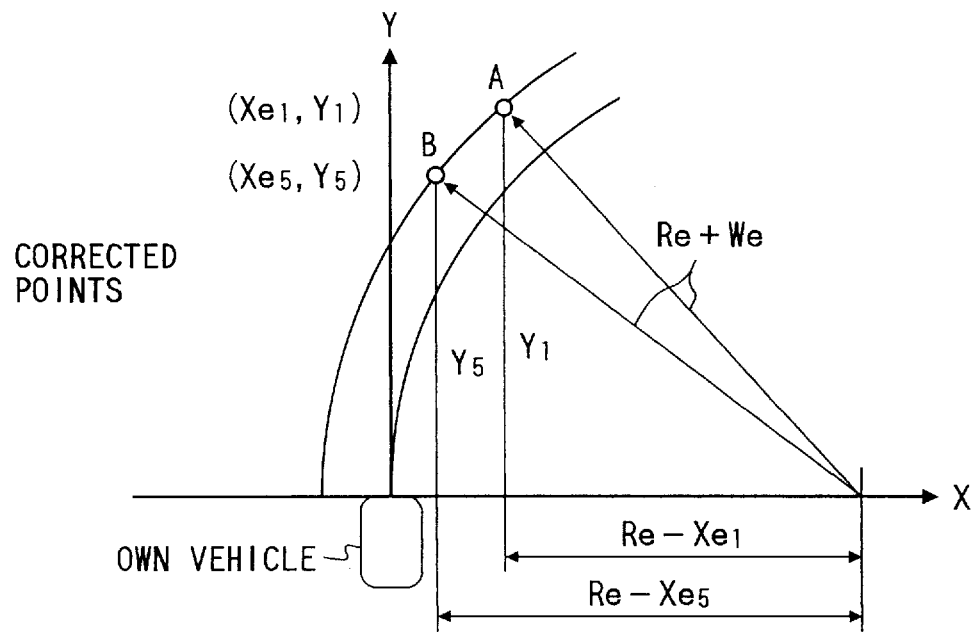
FIG. 15 is a view illustrating curvature radius calculation performed in step S2317 of FIG. 6.

Details of the curvature radius calculation in the step S2317 will be explained hereinafter. FIG. 15 is a view illustrating a curvature radius Re in relation to the corrected start point A (Xe1, Y1) and corrected end point B (Xe5, Y5). In FIG. 15, a distance "We" represents a radial clearance between the target obstacle and the system vehicle. A distance from curve center C to start point A is expressed by (Re+We) which is identical with a distance from curve center C to end point B. An X-directional distance (X-coordinate component) between points A and C is expressed by (Re−Xe1), while an X-directional distance (X-coordinate component) between points B and C is expressed by (Re−Xe5). Accordingly, the following two equations are derived.

$$Y1^2 + (Re-Xe1)^2 = (Re+We)^2$$

$$Y5^2 + (Re-Xe5)^2 = (Re+We)^2$$

Thus, the curvature radius Re is derived.

$$Re = \frac{Y1^2 + Xe1^2 - Y5^2 - Xe5^2}{2(Xe1 - Xe5)}$$

In this manner, when the processing of step S2315 or S2319 is executed, the above-described curvature radius calculation is executed in step S2317. On the other hand, when the processing of step S2321 is executed, the above-described curvature radius calculation is not performed and it is regarded that the vehicle is travelling straight (infinite curvature radius). Thus, the control flow proceeds to the alarm area setting processing "A" in step S2330 of FIG. 5.

Figure 16:
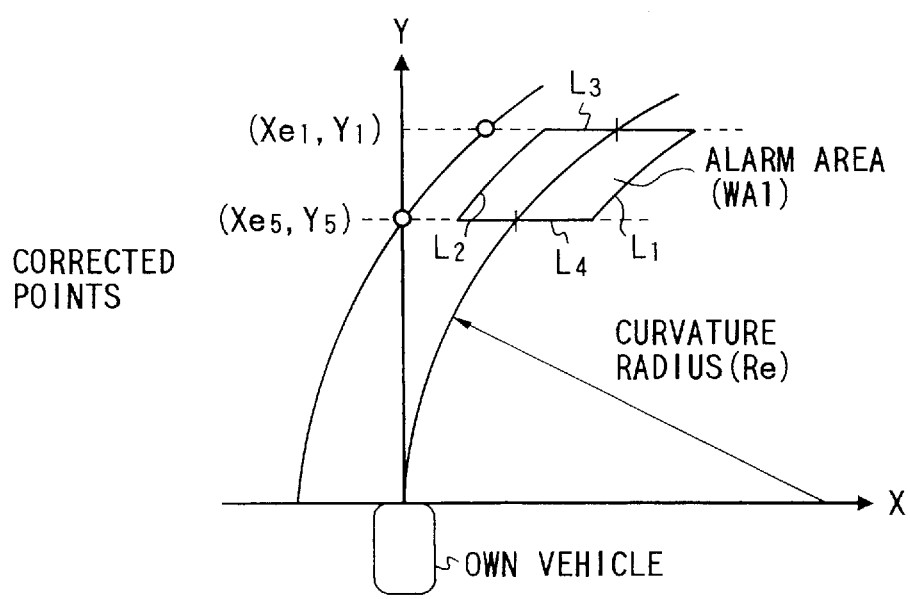
FIG. 16 is a view illustrating alarm area setting performed in step S2330 of FIG. 5.

Details of the alarm area setting in the step S2330 will be explained with reference to FIG. 16. In FIG. 16, an alarm area WA1 has a center line which corresponds to a curve of radius Re estimated through the processing of FIG. 6. The alarm area WA1 has a width equivalent with the lateral width of the vehicle. As shown in FIG. 16, the alarm area WA1 is surrounded by a pair of circular arcs L1 and L2 and a pair of parallel straight lines L3 and L4. Circular arcs L1 and L2 are laterally offset from the curve of radius Re by ±1 m (equivalent to the vehicle width). Straight lines L3 and L4 are lateral lines defined by Y=Y1 and Y=Y5, respectively.

To suppress the computation amount, the following equation is used to set the above-described circular arcs L1 and L2 based on the parabolic approximation.

$$X = \frac{Y^2}{2 \cdot Re} \pm 1 \; (Y1 \geq Y \geq Y5)$$

After the alarm area WA1 has been set in the step S2330, the collision judgement processing "A" is executed in step S2350. The collision judgement processing "A" will be explained with reference to FIGS. 7 and 17.

Figure 7:
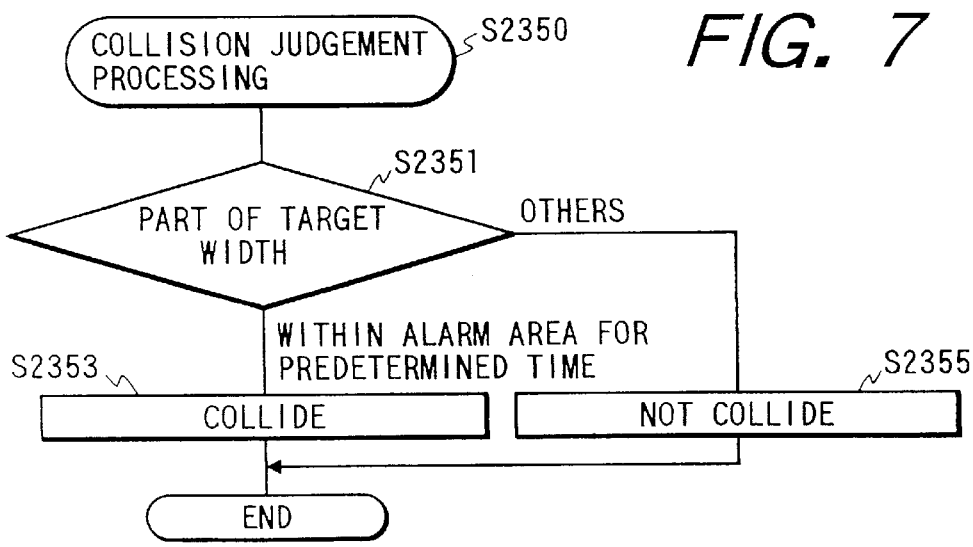
FIG. 7 is a flow chart showing part of the collision judgement processing performed in the control unit of the anti-collision and alarm system in accordance with the present invention.
Figure 17:
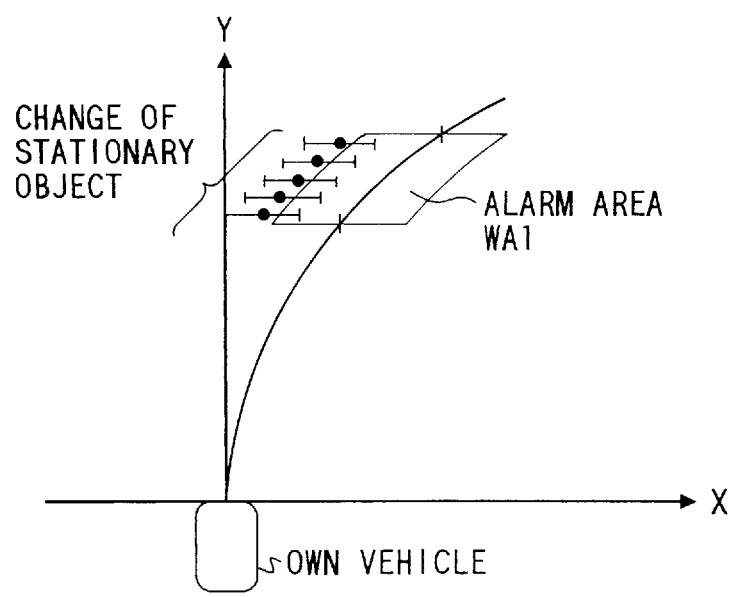
FIG. 17 is a view illustrating collision judgement performed in step S2350 of FIG. 5.

In step S2351 of FIG. 7, a judgement is made to check whether at least part of the target obstacle (in a widthwise direction) is present within the alarm area WA1 for a predetermined time. When the target obstacle is present within the alarm area WA1 for the predetermined time as shown in FIG. 17, the next step S2353 judges that the system vehicle will collide with the target obstacle. Otherwise, step S2355 judges that there will be no possibility of collision.

The curvature radius estimation processing "B" of step S2370, the alarm area setting processing "B" of step S2380, and the collision judgement processing "B" of step S2390 are executed on three consecutively sampled points in the same manner as the above-described processing of steps S2310, S2330 and S2350. For example, when the lateral-directional position correction is performed with respect to the center of the target obstacle, the curvature radius is estimated based on three points (X3, Y3), (X4, Y4) and (X5, Y5) selected among five sampled points (X1, Y1) through (X5, Y5). A curve having this radius is offset by ±1 m in the lateral direction to obtain a pair of parallel circular arcs. Then, an area surrounded by these parallel circular arcs and a pair of straight lines (Y=Y1, Y=Y5) is designated as an alarm area. Then, it is judged as to whether at least part of the target obstacle is present within this alarm area for a predetermined time.

After finishing the collision judgements in this manner, the control flow returns to FIG. 4. When there is the possibility of collision in each of the collision judgement processing "A" and "B" (Steps S2350 and S2390), the first false alarm avoidance processing is executed in step S2400. When there is no possibility of collision, the second false alarm avoidance processing is executed in step S2600.

Figure 8:
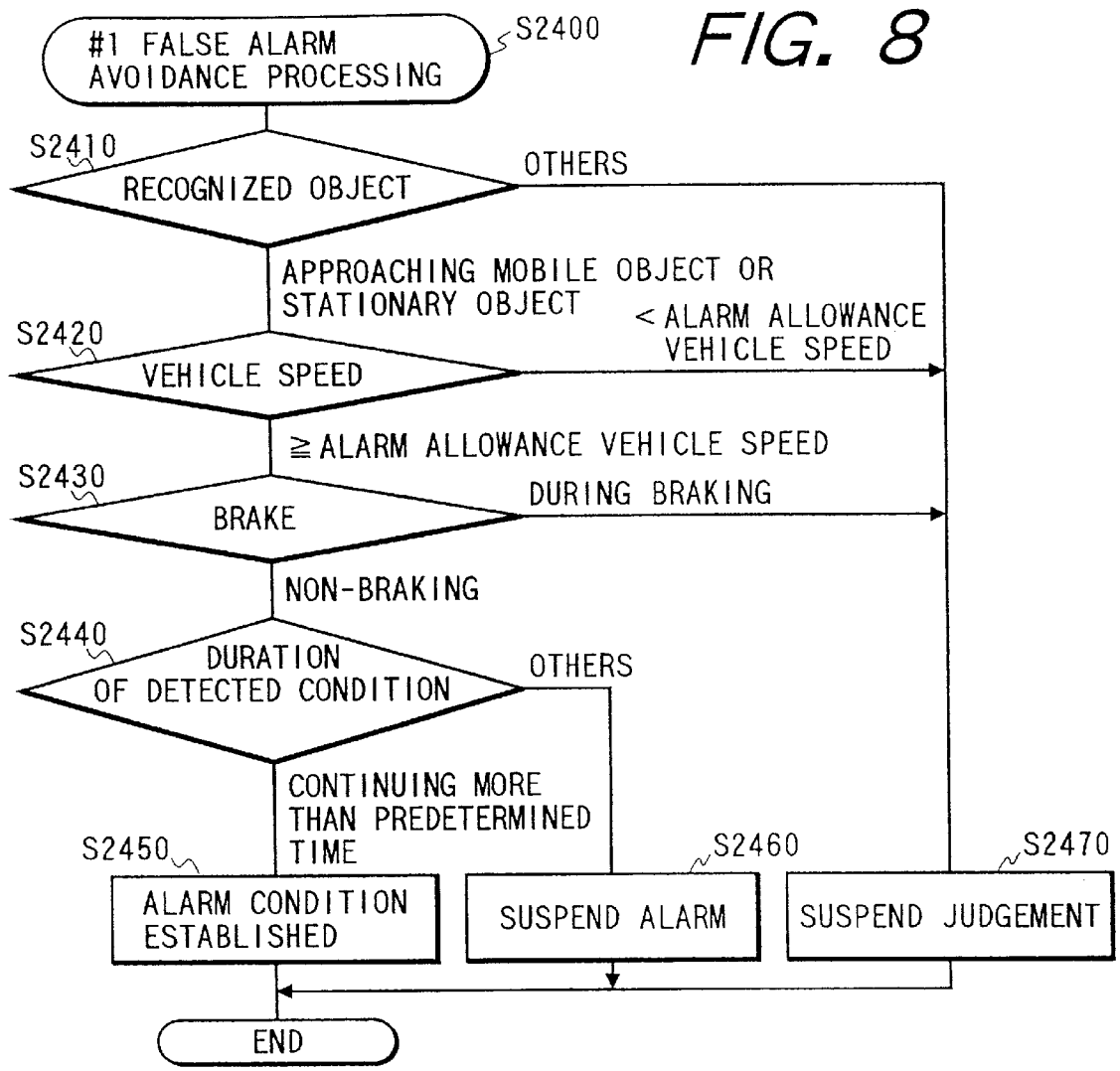
FIG. 8 is a flow chart showing first false alarm avoidance processing performed in the control unit of the anti-collision and alarm system in accordance with the present invention.

FIG. 8 is a flow chart showing details of the first false alarm avoidance processing. First, the condition of the recognized object is judged in step S2410. If the recognized object is an approaching mobile object or an approaching stationary object, the vehicle speed is judged in step S2420. If the recognized object is other than the approaching mobile object or approaching stationary object, the judgement is suspended in step S2470. In other words, when the recognized object is not approaching or moving away from the system vehicle, there is no necessity of executing the judgement.

When the recognized object is the approaching mobile object or approaching stationary object in the step S2410, the next step S2420 makes a judgement as to whether the system vehicle speed exceeds an alarming speed (i.e. alarm allowance speed). For example, when the system vehicle is running at low speeds (e.g. less than 20 Km/h) on a crowded or narrow road or in a parking lot, the vehicle will encounter many approaching mobile objects or stationary objects. Under such circumstances, it will be not effective to generate alarms frequently if the vehicle speed is sufficiently low. Thus, the vehicle speed judgement in step S2420 is executed to eliminate unnecessary alarming. If the system vehicle speed is less than the alarm allowance speed (e.g. 20 Km/h), the judgement is suspended (Step S2470). Once the system vehicle speed exceeds the alarm allowance speed, it is preferable to effect alarming until the system vehicle speed falls below a lower speed (e.g. 15 Km/h).

If the system vehicle speed is not less than the alarm allowance speed, a subsequent judgement is made in step S2430 based on the condition of the brake switch 9 to check as to whether the system vehicle is in a braking operation. If the vehicle is in the braking condition, the judgement is suspended (Step S2470). In short, when the driver is depressing the brake pedal, it is judged that the driver already perceived the impending danger and has already started the operation necessary for avoiding the danger. Thus, the alarm is no longer necessary and will be rather annoying to the driver. It is therefore better to suspend the alarm operation.

If the braking force is not applied, a subsequent judgement is made in step S2440 to check whether the non-braking condition is continuing for a predetermined period of time (e.g. 0.3 sec) or more. This is to eliminate erroneous alarming due to noise. From experimental data, a truly-alarm-requiring condition continues for 0.3 sec or more.

If the detected non-braking condition is discontinuous, the alarm operation is suspended in step S2460. On the contrary, if the detected non-braking condition is continuous for the predetermined time or more, it is recognized in step S2450 that the alarm condition is certainly established.

In this manner, the judgements for the alarm establishment (S2450), alarm suspension (S2460), and judgement suspension (S2470) are executed in parallel. After finishing the above-described three judgements, the control flow returns to FIG. 4. If the alarm condition is established, step S2500 starts the alarming operation. When the alarm is suspended, the stationary object alarm processing S2000 of FIG. 4 is terminated. When the judgement is suspended, the control flow proceeds to step S2600 to execute the second false alarm avoidance processing.

Figure 9:
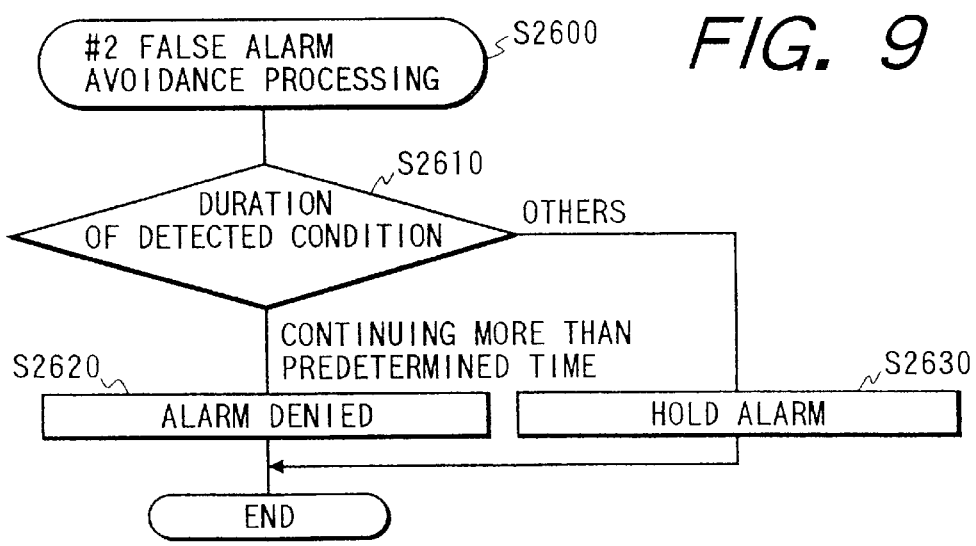
FIG. 9 is a flow chart showing second false alarm avoidance processing performed in the control unit of the anti-collision and alarm system in accordance with the present invention.

Next, details of the second false alarm avoidance processing (i.e. Step S2600) will be explained with reference to FIG. 9. The second false alarm avoidance processing, as shown in the flow chart of FIG. 9, provides a time interval to prevent the alarm from being unintentionally stopped based on momentary result of detection. More specifically, a judgement is made in step S2610 as to whether the condition of step S2200 (i.e. actual distance<stationary object alarm distance) is continuing for a predetermined time or more. If this condition is not continuing more than the predetermined time, the alarm is held or maintained in step S2630. If this condition is continuing more than the predetermined time, the alarm condition is denied in step S2620. In the case where the alarm condition is denied in the judgement of the step S2620, the alarm generator 13 stops generating an alarm in step S2700. In other words, the alarm is not stopped even if the actual distance exceeds the stationary object alarm distance for a very short period of time.

Figure 10:
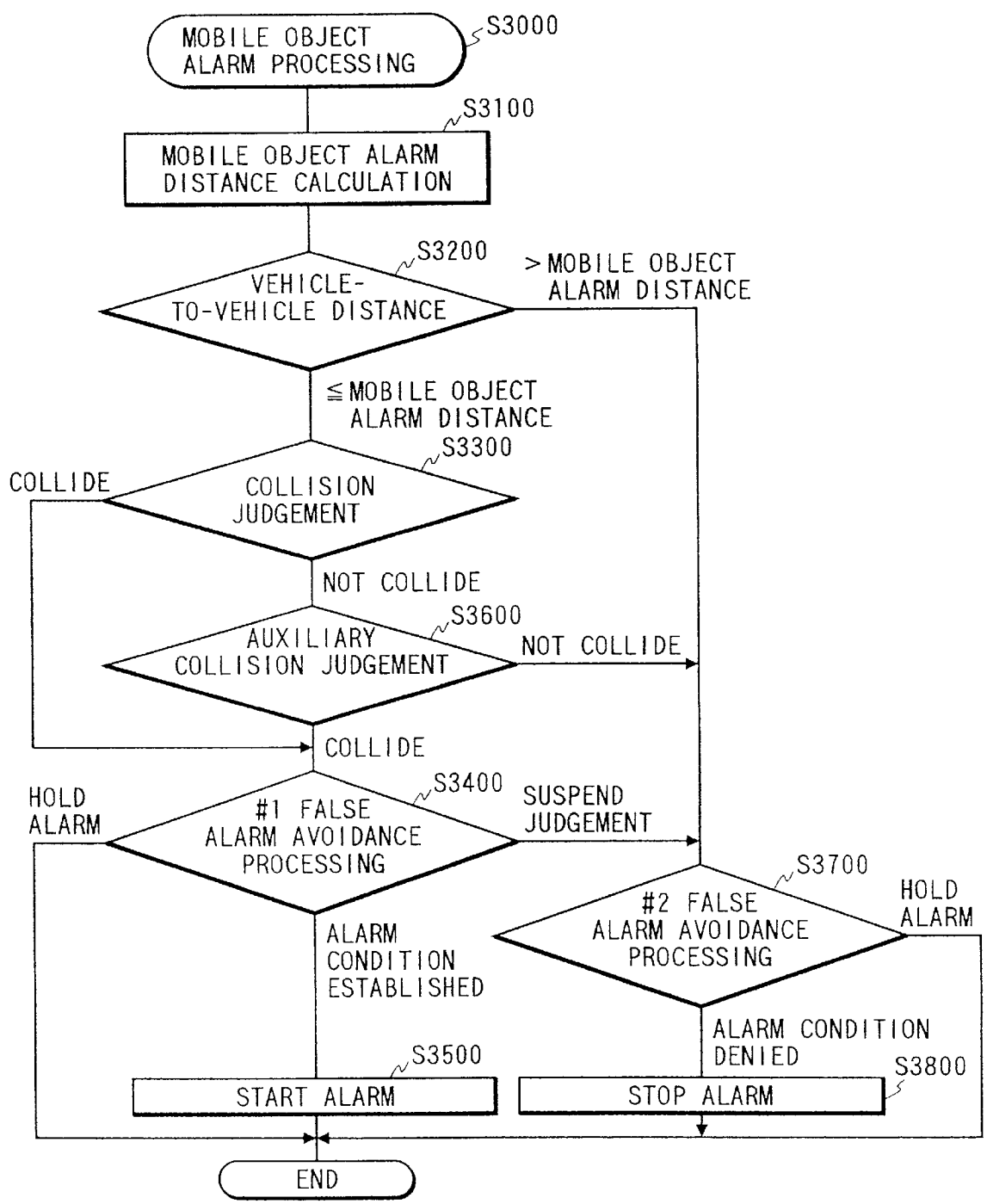
FIG. 10 is a flow chart showing mobile object alarm processing performed in the control unit of the anti-collision and alarm system in accordance with the present invention.

Hereinafter, the mobile object alarm processing of step S3000 will be explained with reference to FIG. 10. The mobile object alarm processing of step S3000 is basically similar to the stationary object alarm processing of step S2000, but is different in the contents of steps S3100, S3200 and S3600. In other words, steps S3300, S3400, S3500, S3700 and S3800 of FIG. 10 are basically identical with steps S2300, S2400, S2500, S2600 and S2700 of FIG. 4, respectively.

More specifically, step S3100 is a mobile object alarm distance calculating step which is executed to obtain a mobile object alarm distance. Next, in step S3200, the mobile object alarm distance is compared with an actual distance between the system vehicle and the target obstacle. When the actual distance between the system vehicle and the target obstacle is not larger than the mobile object alarm distance, a collision judgement is performed in step S3300.

The mobile object alarm distance is determined by taking account of the following two factors III and IV in addition to the above-described factor I (i.e. response time factor) and factor II (i.e. own vehicle deceleration factor):

(III) an uneasy distance factor expressed by a distance between a preceding vehicle and the system vehicle; and (IV) a preceding vehicle deceleration factor expressed by a depression strength at the brake pedal of the system vehicle (perceived by the driver of the system vehicle).

Regarding factor III, each driver typically enlarges the vehicle-to-vehicle distance by applying the brakes when the driver feels uneasiness. This distance is proportional to the vehicle speed and is referred to as uneasy distance in this embodiment.

Regarding factor IV, the driver will apply the brakes immediately after the preceding vehicle starts decelerating. However, there is a time lag between a moment the preceding vehicle starts decelerating and a moment a substantial speed difference is generated. Due to this time lag, the timing for the alarming is delayed significantly. Thus, the preceding vehicle deceleration factor is considered.

The next step S3600, which is an auxiliary collision judgement processing, will be explained in detail with reference to FIG. 11. The auxiliary collision judgement processing is performed when there is no possibility of collision in the step S3300. If any possibility of collision is found in this auxiliary collision judgement processing of step S3600, the control flow proceeds to step S3400.

In general, there is a possibility that another mobile object may cut into a clearance between two vehicles. In such a case, it is necessary to generate an alarm quickly. This is why the auxiliary collision judgement processing is executed. Compared with the flow chart of FIG. 5, the auxiliary collision judgement processing shown in FIG. 11 is simple so that the alarm processing can be accomplished promptly.

Figure 11:
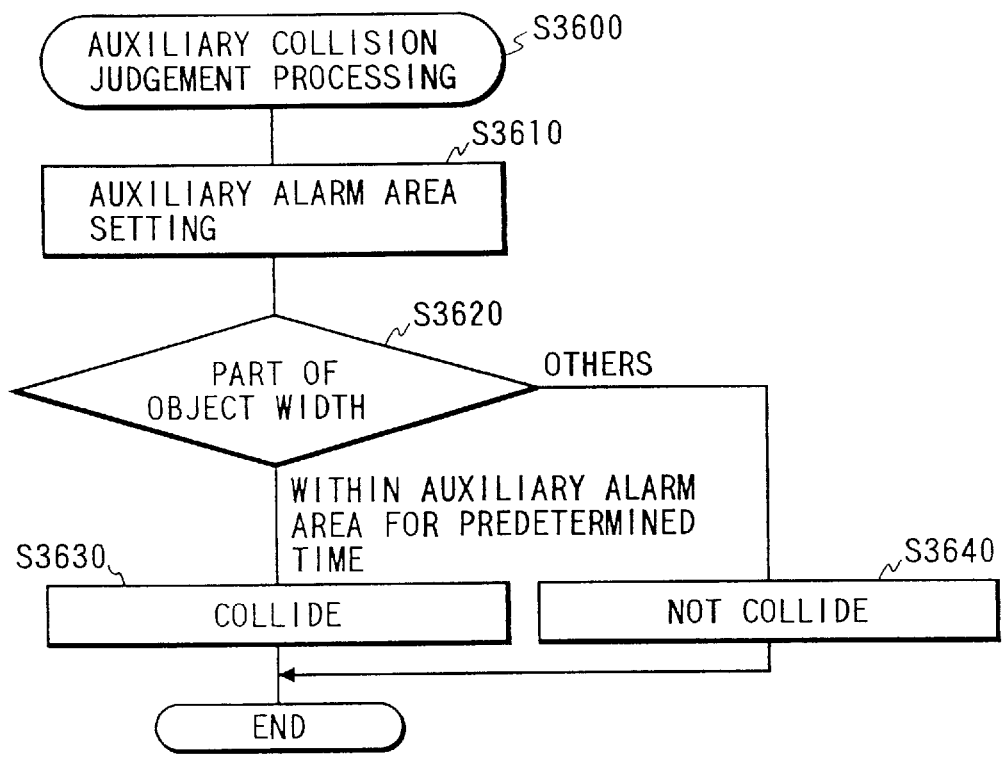
FIG. 11 is a flow chart showing auxiliary collision judgement processing performed in the control unit of the anti-collision and alarm system in accordance with the present invention.

In FIG. 11, an auxiliary alarm area WA2 is set in step S3610. Then, a judgement is made in step S3620 to check whether at least part of the target object stays in this auxiliary alarm area WA2 for a predetermined time. Step S3630 judges that there is a possibility of collision when at least part of the target object stays in the auxiliary alarm area WA2 for the predetermined time. Otherwise, step S3640 judges that there is no possibility of collision. Since the setting of auxiliary alarm area WA2 in step S3610 is simple, processing time is fairly reduced.

Details of the setting of auxiliary alarm area WA2 will be explained with reference to FIGS. 18A, 18B and 19A, 19B, 19C.

Figure 18A:
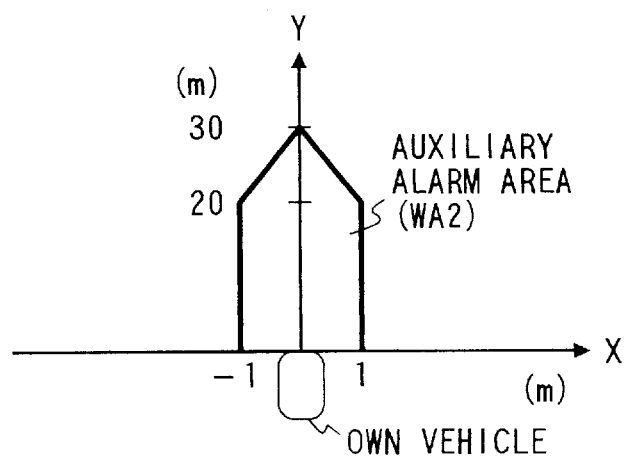
FIGS. 18A and 18B are views illustrating auxiliary alarm area setting for highways performed in step S3610 of FIG. 11.

FIG. 18A shows an example of auxiliary alarm area WA2 used for highways. The alarm auxiliary area WA2 of FIG. 18A is a pentagon extending ahead of the system vehicle, with a width of 2 m, a central longitudinal line of 30 m and side edges of 20 m. The dimensions of the auxiliary alarm area WA2 are determined by considering the highways standards that a curvature radius is not smaller than 300 m and a traffic lane width is 3.5 m as well as the legal speed limit of, say, 100 K/m. Furthermore, the pentagonal shape of the auxiliary alarm area WA2 is determined so as to avoid erroneous alarms responsive to other vehicles running on other traffic lanes.

Figure 18B:
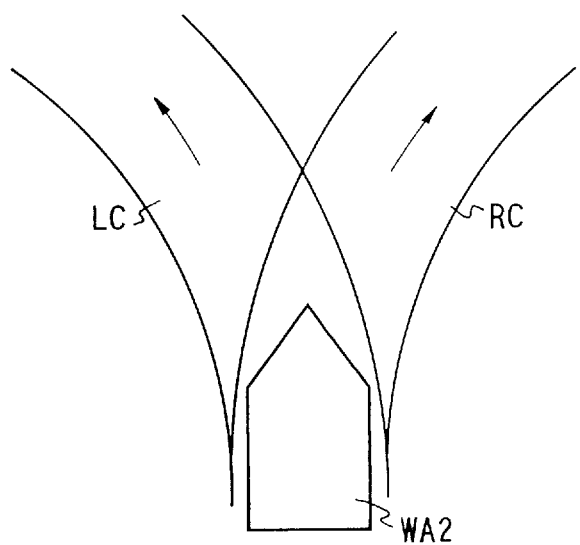

As shown in FIG. 18B, the pentagonal shape of auxiliary alarm area WA2 is commonly used for right curve RC and left curve LC, and is effective to set a long distance for the central region thereof.

In the setting of auxiliary alarm area WA2 for highways, there is no necessity of performing complicated computations. Step S3610 is simply accomplished by setting the above-described area WA2 having the predetermined dimensions.

Figure 19A:
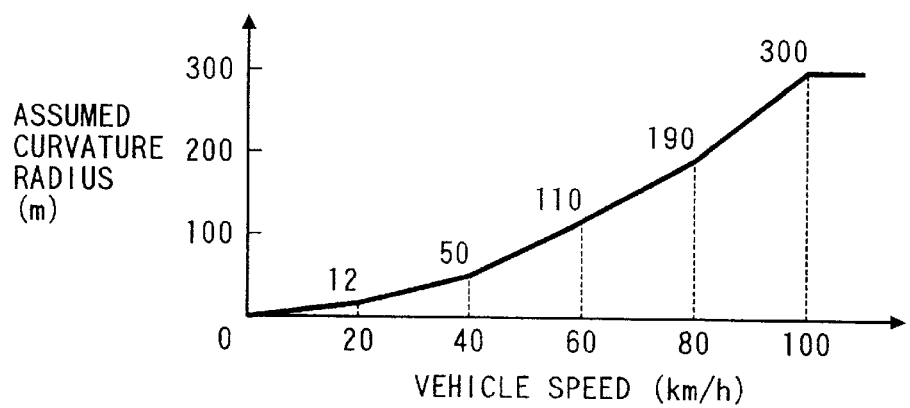
FIGS. 19A to 19C are views illustrating auxiliary alarm area setting for ordinary roads.
Figure 19B:
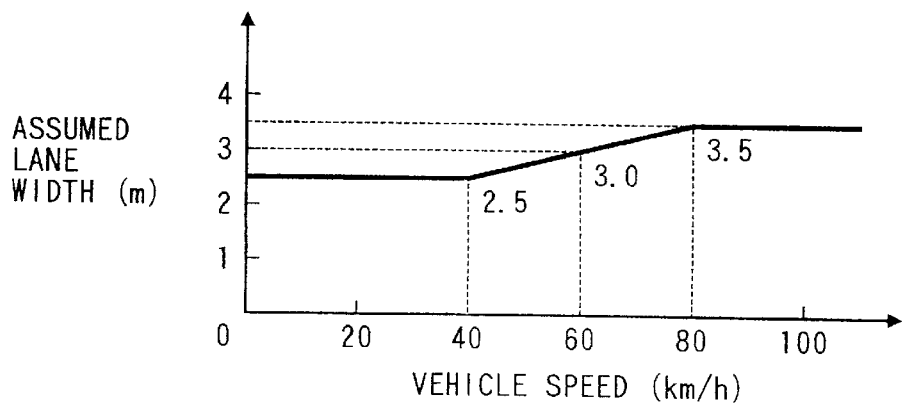

When a vehicle travels on ordinary roads other than highways, the vehicle will have changes to travel on steeply curved roads. If the auxiliary alarm area WA2 for highways is used directly for such steeply curved roads, there will be erroneous judgements. To eliminate such problems, it is desirable that an auxiliary alarm area for ordinary roads be set separately by amending the dimensions of auxiliary alarm area WA2 for highways. Ordinary roads have traffic lanes narrower than those of highways. Vehicles travelling at low speeds tend to approach the edges of roads. Hence, it is necessary to modify both an assumed curvature radius and an assumed lane width of an ordinary road in accordance with vehicle speed as shown in FIGS. 19A and 19B. Then, the dimensions of auxiliary alarm area WA2 for ordinary roads are determined with reference to map data shown in FIG. 19C.

Figure 19C:
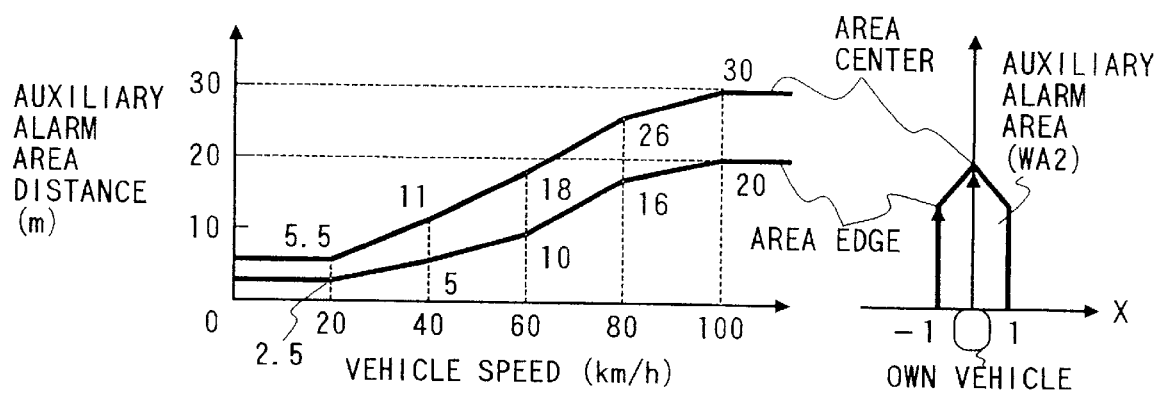

With reference to the map data shown in FIG. 19C, both of the central area distance and the edge area distance are read in accordance with the vehicle speed. Thus, the above-described modification is performed simply.

As explained in the foregoing description, anti-collision and alarm system 1 calculates two curvature radii based on different combinations of sampling data in steps S2310 and S2370, then sets alarm areas WA1 based on these curvature radii in steps S2330 and S2380 and executes alarm judgements in steps S2350 and S2390, separately. This is effective to assure accuracy of the collision judgement in a transient phase, for example, when the travelling curve of the system vehicle changes momentarily. Such a momentary change of the travelling curve of the system vehicle is detected as a difference between two radii calculated independently in steps S2310 and S2370. The difference between two radii is reflected as a difference in the position of each alarm area WA1 and the collision judgement result. Accordingly, the anti-collision and alarm system 1 can accurately generate an alarm even in a transient phase, such as a transfer from a straight road to a curved road or a transfer from a curved road to a straight road, where the radius of the travelling curve of the system vehicle is changed significantly.

Especially, the anti-collision and alarm system 1 allows generation of an alarm (step S2500) only when both steps S2350 and S2390 judge that there is the possibility of a collision. Thus, erroneous alarms can be surely eliminated. For example, when the radius of the travelling curve of the system vehicle varies in accordance with a change of the steering angle, the above-described alarm areas WA1 in the steps S2330 and S2380 do not agree with each other. In such a case, an alarm is generated only when the target obstacle exists in both of the alarm areas WA1 for a predetermined time.

This operation will be explained in greater detail with reference to FIGS. 20 and 21. For the convenience of explanation, positions of sampling points (X1, Y1) through (X5, Y5) in FIGS. 20 and 21 are differentiated from those shown in FIGS. 13 through 17.

Figure 20:
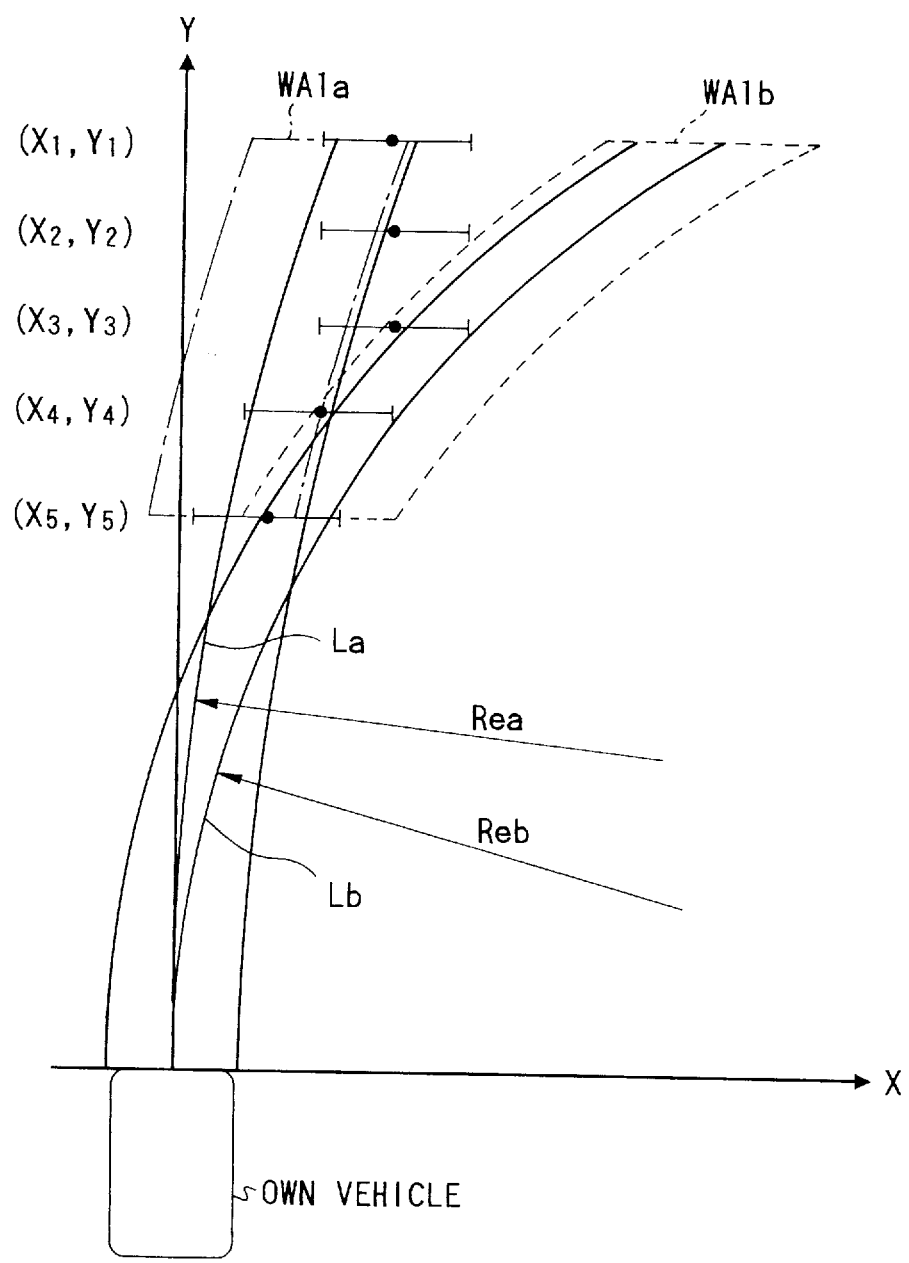
FIG. 20 is a view comparatively showing alarm areas set in steps S2330 and S2380 of FIG. 5.

As shown in FIG. 20, step S2310 obtains curve La having curvature radius Rea based on five sampling points (X1, Y1) through (X5, Y5). Then, a pair of circular arcs is obtained by parallel shifting the curve La by ±1 m. Alarm area WA1$a$ is surrounded by these parallel circular arcs and a pair of straight lines Y=Y1 and Y=Y5. Next, step S2370 obtains curve Lb having curvature radius Reb based on three sampling points (X3, Y3) through (X5, Y5). Then, a pair of circular arcs is obtained by parallel shifting the curve Lb by ±1 m. Alarm area WA1$b$ is surrounded by these parallel circular arcs and a pair of straight lines Y=Y1 and Y=Y5. Curvature radii Rea and Reb are significantly different at the entrance and exit of a curve. Hence, as shown in FIG. 20, alarm areas WA1$a$ and WA1$b$ are significantly different.

Figure 21:
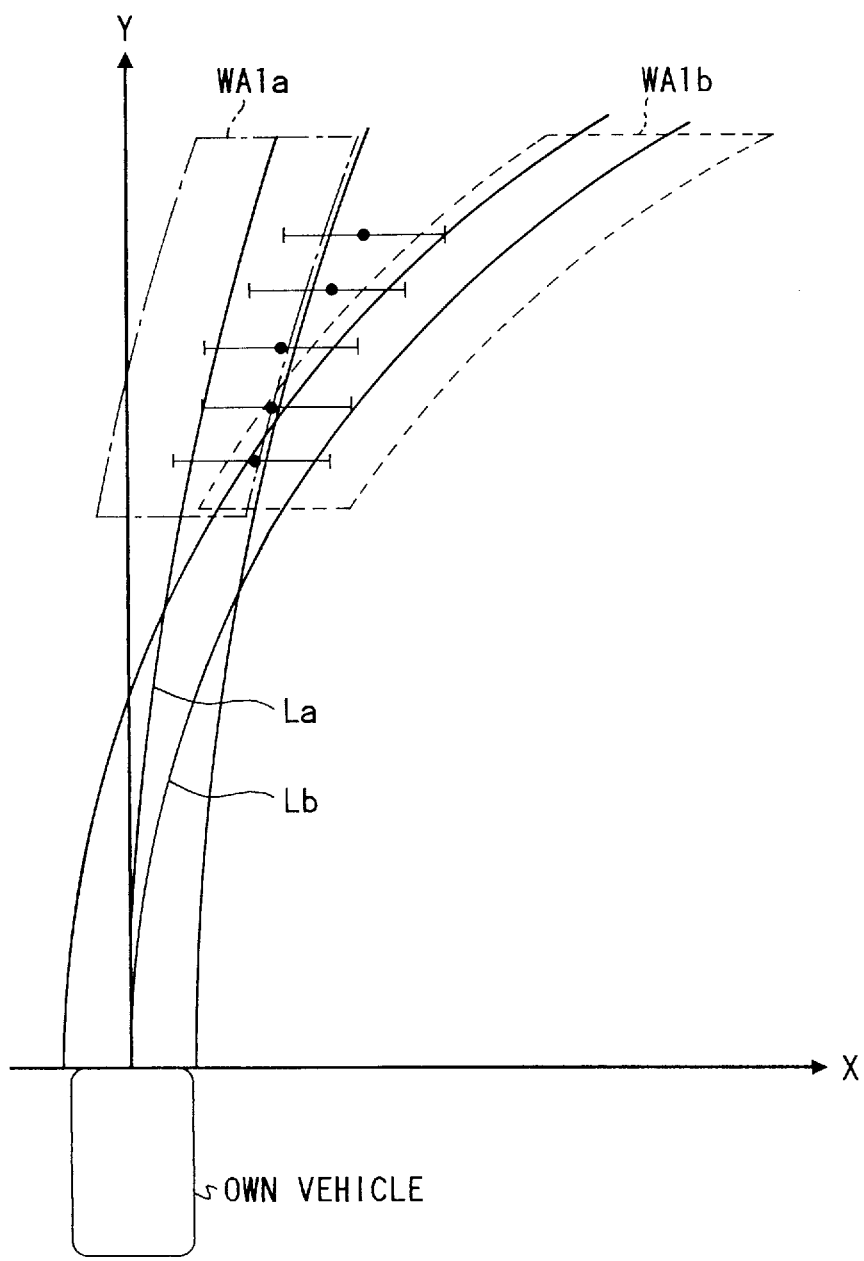
FIG. 21 is a view comparatively showing collision judgements performed in steps 2350 and 2390 of FIG. 5.

Hence, steps S2350 and S2390 judge that there is the possibility of a collision only when the same target obstacle stays in both of alarm areas WA1$a$ and WA1$b$ for the predetermined time (e.g. a time interval equivalent to five times a scanning period in the example shown in FIG. 21). Thus, the alarm is accurately generated at the moment the steering angle is changed suddenly.

Steps S2310 and S2370 commonly use the latest sampling data (X3, Y3) through (X5, Y5) for obtaining radii Rea and Reb. This is advantageous to reflect the latest sampling data in calculating radii Rea and Reb. In other words, the alarm is accurately generated.

In the above-described embodiment, step S2310 functions as first radius calculating means, step S2330 functions as first alarm region setting means, step S2370 functions as second radius calculating means, and step S2380 functions as second alarm region setting means.

The present invention is not limited to the above-described embodiment.

Figure 22:
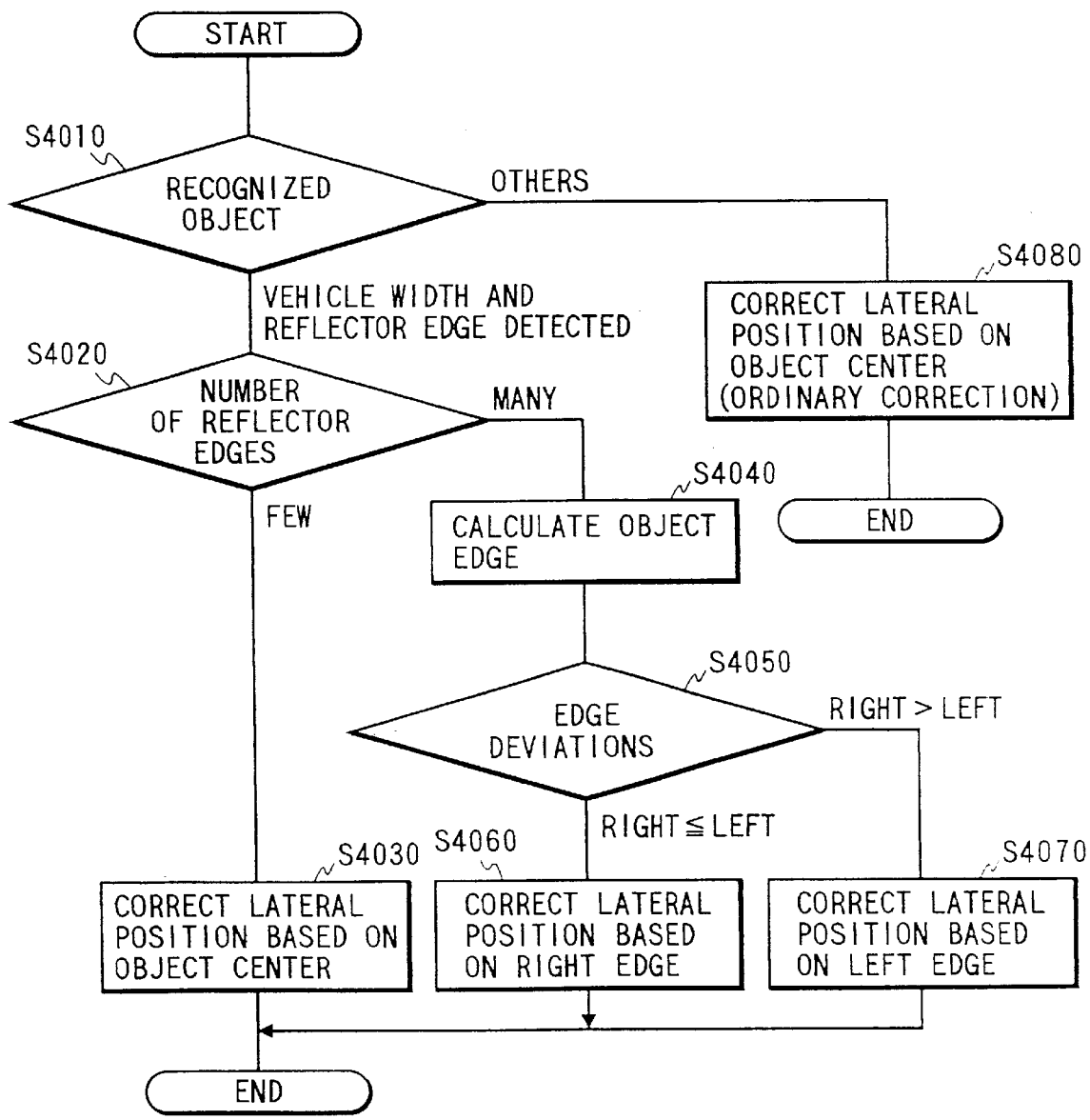
FIG. 22 is a flow chart showing error avoidance processing eliminating collision judgement error derived from a stained reflector.

For example, FIGS. 22 and 23 show another embodiment of the present invention. This embodiment includes error avoidance processing as a countermeasure for eliminating errors derived from a stain on the surface of the reflector as shown in FIG. 22. This processing is substituted for step S2315 of FIG. 6.

When the reflector of a preceding vehicle is stained or soiled, either one of right and left edges of the reflector may not be recognized. In such a case, there is a possibility that the curvature radius will be erroneously estimated. To solve this problem, there are two estimation methods:

(1) a method of estimating the curvature radius without using data obtained when either one of right and left edges of the reflector is not recognized; and (2) a method of estimating the curvature radius based on the edge of the target object.

Accordingly, in step S4010 of FIG. 22, a judgement is made to check whether there is a target obstacle having a predetermined vehicle width (e.g. 1.0 m or less) and whether there is a target object equivalent to one edge of the reflector having a predetermined width (e.g. 0.6 m or less).

Figure 23A:
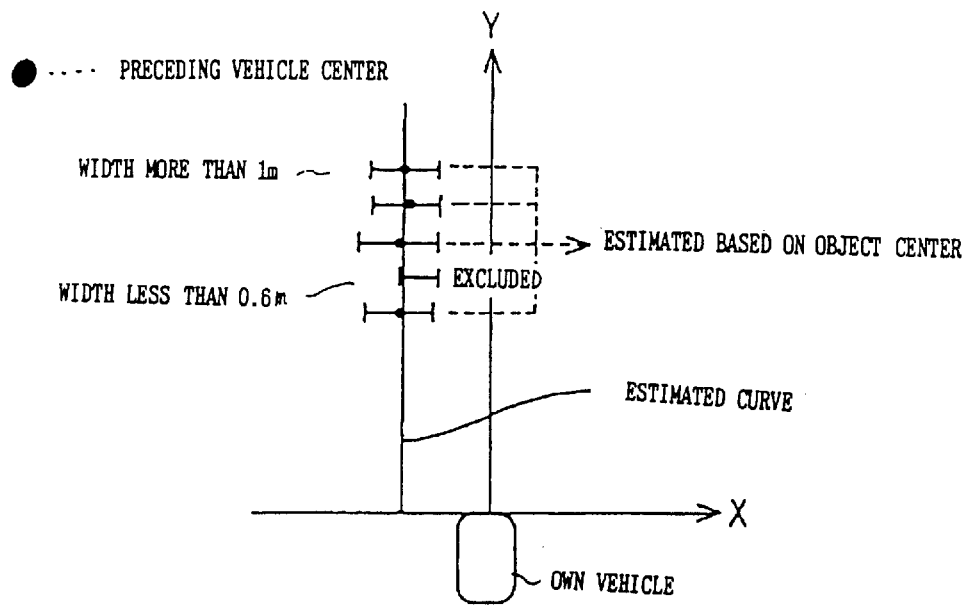
FIGS. 23A and 23B are views illustrating error avoidance processing of FIG. 22.

If there is a target object satisfying the condition of step S4010, the next step S4020 changes the estimation method of the curve in accordance with the number of data representing the one edge of the reflector. When the number of the reflector's edge data is few (e.g. 1 or 0), these reflector's edge data are completely neglected and the lateral-directional position correction is performed by using only the data representing the center of the target obstacle (Step S4030). In this lateral-directional position correction, a linear approximation is obtained based on the least square of their relative position data and the position data of start and end points are corrected in the same manner as in the step S2315 of FIG. 6. FIG. 23A illustrates the correction performed in step S4030.

Figure 23B:
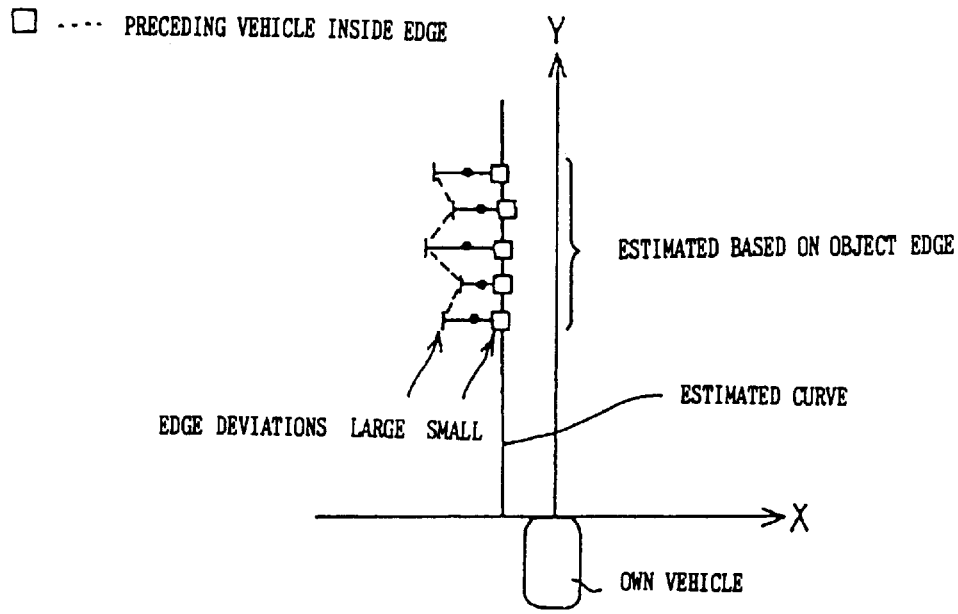

On the contrary, when the number of the reflector's edge data is many (e.g. 2 or more), the edge of the target object is calculated in step S4040. Then, the next step S4050 compares deviations of five (or three) sampled edge data (i.e. sum of absolute values) between the right edge and the left edge of the target object. Then, based on the right or left edge data which has smaller deviations, step S4060 or S4070 corrects the lateral-directional position. A linear approximation is obtained based on the least square of their relative position data and the position data of start and end edge points are corrected in the same manner as in the step S4030. FIG. 23B illustrates the correction performed in step S4060 or S4070.

When the target object satisfying the condition of step S4010 is not detected, the control flow proceeds to step S4080 to execute an ordinary lateral-directional position correction based on the data representing the center of the object. This processing is substantially identical with the processing performed in step S2315.

In the calculation of the curvature radius, there are various methods for selecting appropriate relative position data among the center data, right edge data and left edge data of the preceding vehicle. For example, based on the relative position data obtained during the past five or three sampling operations, the following sum is obtained with respect to each of the center data, right edge data and left edge data.

$$\Sigma \, (a \cdot Y_j + b - X_j)^2$$

where a and b are constants calculated in the same manner as in step S2315.

Then, among the center data, right edge data and left edge data, the data group having the smallest sum is selected as appropriate relative position data used in the calculation of the curvature radius.

According to the above-described embodiment, step S2300 recognizes the possibility of collision only when both steps S2350 and S2390 detected the possibility of collision. It is also preferable that step S2300 recognizes the possibility of collision when either one of steps S2350 and S2390 detected the possibility of collision. In this case, it is recommendable to reduce the alarm areas WA1 set in steps S2330 and S2380.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. An anti-collision and alarm system installable on an automotive vehicle, the system comprising:

target obstacle detecting means for successively sampling a distance and an angle of a target obstacle relative to a system vehicle equipped with the anti-collision and alarm system, when said target obstacle is present in a predetermined scanning zone;

first radius calculating means for calculating a first radius of an estimated travelling curve of said system vehicle in relation to said target obstacle based on a first group of distance and angle data detected at a plurality of sampling times by said target obstacle detecting means;

second radius calculating means for calculating a second radius of an estimated travelling curve of said system vehicle in relation to said target obstacle based on a second group of distance and angle data detected at a plurality of sampling times by said target obstacle detecting means, said first group being different from said second group in combination of said distance and angle data;

first alarm region setting means for setting a predetermined first alarm region based on said first radius calculated by said first radius calculating means;

second alarm region setting means for setting a predetermined second alarm region based on said second radius calculated by said second radius calculating means; and alarm means for generating an alarm based on a positional relationship between the target obstacle detected by said target obstacle detecting means and each of said first alarm region set by said first alarm region setting means and said second alarm region set by said second alarm region setting means, wherein said alarm means is activated only when said target obstacle detected by said target obstacle detecting means is present in both of said first alarm region and said second alarm region.

2. The anti-collision and alarm system in accordance with claim 1, wherein said first group of distance and angle data used for obtaining said first radius includes all of said second group of distance and angle data used for obtaining said second radius.

3. The anti-collision and alarm system in accordance with claim 2, wherein said first group of distance and angle data includes distance and angle data sampled prior to said second group of distance and angle data.

* * * * *